United States Patent
Jo et al.

(10) Patent No.: US 11,789,526 B2
(45) Date of Patent: Oct. 17, 2023

(54) METHOD AND ELECTRONIC SYSTEM FOR OUTPUTTING VIDEO DATA AND AUDIO DATA

(71) Applicant: SAMSUNG ELECTRONICS CO., LTD., Suwon-si (KR)

(72) Inventors: Nammin Jo, Suwon-si (KR); Jinchoul Lee, Suwon-si (KR); Minjung Park, Suwon-si (KR); Juyoung Yu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/877,388

(22) Filed: Jul. 29, 2022

(65) Prior Publication Data

US 2023/0051068 A1 Feb. 16, 2023

Related U.S. Application Data

(63) Continuation of application No. PCT/KR2022/008218, filed on Jun. 10, 2022.

(30) Foreign Application Priority Data

Aug. 10, 2021 (KR) .................. 10-2021-0105303

(51) Int. Cl.
*G06F 3/01* (2006.01)
*G02B 27/01* (2006.01)
*G06T 19/00* (2011.01)

(52) U.S. Cl.
CPC .......... *G06F 3/011* (2013.01); *G02B 27/0172* (2013.01); *G06T 19/006* (2013.01); *G06F 3/012* (2013.01); *G06F 3/013* (2013.01)

(58) Field of Classification Search
None
See application file for complete search history.

(56) References Cited

U.S. PATENT DOCUMENTS

| 10,178,487 B2 * | 1/2019 | Anastas | ................. G10L 19/018 |
| 11,093,123 B1 * | 8/2021 | Rossi | ..................... G06F 3/147 |

(Continued)

FOREIGN PATENT DOCUMENTS

| JP | 2019537911 A | 12/2019 |
| KR | 20010018572 A | 3/2001 |

(Continued)

*Primary Examiner* — Jwalant Amin
(74) *Attorney, Agent, or Firm* — CANTOR COLBURN LLP

(57) ABSTRACT

According to an aspect, an electronic system for outputting video data and audio data includes a terminal device which generates the audio data and the video data; a wearable audio device which communicatively connects to the terminal device through a first wireless communication scheme; and a wearable augmented reality (AR) device which communicatively connects to the terminal device through a second wireless communication scheme. The wearable AR device receives the audio data and the video data from the terminal device, outputs the video data through a display of the wearable AR device, and outputs the audio data through a speaker of the wearable AR device, and the wearable audio device receives the audio data output from the wearable AR device using a microphone of the wearable audio device and outputs the audio data received from the wearable AR device through a speaker of the wearable audio device.

20 Claims, 11 Drawing Sheets

(56) References Cited

U.S. PATENT DOCUMENTS

| | | | | |
|---|---|---|---|---|
| 11,523,244 | B1* | 12/2022 | Meade | H04R 3/005 |
| 2012/0095749 | A1* | 4/2012 | Capretta | H04H 20/63 |
| | | | | 704/8 |
| 2016/0196693 | A1* | 7/2016 | Kobayashi | G06F 3/0346 |
| | | | | 345/633 |
| 2016/0269712 | A1* | 9/2016 | Ostrover | H04S 7/305 |
| 2019/0335287 | A1* | 10/2019 | Jung | H04N 7/157 |
| 2019/0349662 | A1* | 11/2019 | Lindahl | H04R 3/12 |
| 2019/0369725 | A1* | 12/2019 | Chen | A61M 21/02 |
| 2020/0051527 | A1* | 2/2020 | Ngo | G06F 3/011 |

FOREIGN PATENT DOCUMENTS

| | | |
|---|---|---|
| KR | 20090029024 A | 3/2009 |
| KR | 20130087678 A | 8/2013 |
| KR | 20170011049 A | 2/2017 |
| KR | 20170115480 A | 10/2017 |
| KR | 20170138588 A | 12/2017 |
| KR | 101886735 B1 | 8/2018 |

* cited by examiner

METHOD AND ELECTRONIC SYSTEM FOR OUTPUTTING VIDEO DATA AND AUDIO DATA

CROSS-REFERENCE TO RELATED APPLICATIONS

This application is a continuation of International Application No. PCT/KR2022/008218 designating the United States, filed on Jun. 10, 2022, in the Korean Intellectual Property Receiving Office and claiming priority to Korean Patent Application No. 10-2021-0105303, filed on Aug. 10, 2021, in the Korean Intellectual Property Office, the disclosures of which are incorporated by reference herein in their entireties.

BACKGROUND

1. Field

Various example embodiments of the disclosure relate to technology for outputting video data and audio data.

2. Description of Related Art

Currently, with the rapid development of electronic devices, such as smartphones or tablet personal computers (PCs), electronic devices capable of making wireless voice calls and information exchange can be helpful in our daily lives. In an initial stage of distribution, such electronic devices have been recognized as portable devices. However, with the development of technology and introduction of the wireless Internet, the electronic devices have evolved into multimedia devices that perform functions, such as schedule management, games, remote control, and image capturing beyond portable devices capable of making simple wireless calls.

In particular, currently, an electronic device that provides an augmented reality (AR) service has been released. The AR service refers to a service that overlappingly displays a virtual image with additional information on a real-world image viewed by a user and may provide the user with a virtual object image that includes content related to a real object identified from the real-world image.

SUMMARY

In the case of outputting video data and audio data from different electronic devices, wireless communication may be used to deliver the video data and the audio data to the different electronic devices for output thereof and, in this case, the video data and the audio data may not be simultaneously output due to a delay time of the wireless communication.

A method and an electronic system for outputting video data and audio data according to an example embodiment can reduce a delay time used to deliver audio data and to simultaneously output video data and audio data by delivering the audio data in a form of sound when delivering the audio data to another electronic device for output thereof, in the case of outputting the video data and the audio data from different electronic devices.

An electronic system for outputting video data and audio data according to an example embodiment includes a terminal device which generates the audio data and the video data; a wearable audio device which communicatively connects to the terminal device through a first wireless communication scheme; and a wearable augmented reality (AR) device which communicatively connects to the terminal device through a second wireless communication scheme. Based on determining that an application provides three-dimensional (3D) content, in a first mode, the wearable AR device receives the audio data and the video data from the terminal device, outputs the video data through a display of the wearable AR device, and outputs the audio data through a speaker of the wearable AR device, and the wearable audio device receives the audio data output from the wearable AR device using a microphone of the wearable audio device and outputs the audio data received from the wearable AR device through a speaker of the wearable audio device.

A method of outputting video data and audio data includes determining whether an application provides 3D content; and operating in a first mode based on determining that the application provides the 3D content. The operating in the first mode includes receiving, by a wearable AR device, the audio data and the video data from a terminal device through a second wireless communication scheme; outputting, by the wearable AR device, the audio data through a speaker of the wearable AR device; receiving, by a wearable audio device communicatively connected to the terminal device through a first wireless communication scheme, the audio data output from the wearable AR device using a microphone of the wearable audio device; and outputting, by the wearable audio device, the received audio data through a speaker of the wearable audio device.

An electronic system for outputting video data and audio data according to an example embodiment includes a wearable AR device configured to generate the audio data and the video data; and a wearable audio device configured to receive the audio data from the wearable AR device through wireless communication connection with the wearable AR device and to output the audio data. Based on determining that an application provides 3D content, in a first mode, the wearable AR device outputs the audio data through a speaker of the wearable AR device, and the wearable audio device receives the audio data output from the wearable AR device using a microphone of the wearable audio device and output the audio data received from the wearable AR device through a speaker of the wearable audio device.

A method of outputting video data and audio data related to an application includes determining whether the application provides 3D content. Based on determining that the application provides the 3D content, the audio data is output through a speaker of a wearable AR device of an electronic system and receiving the audio data through a microphone of a wearable audio device of the electronic system. Based on determining that the application does not provide the 3D content, the audio data is transmitted to the wearable audio device. The video data is output through the wearable AR device.

A method and an electronic system for outputting video data and audio data according to an example embodiment may reduce a delay time of data transmission and simultaneously output video data and audio data using different electronic devices by delivering the audio data in a form of sound using a speaker and a microphone without using wired communication and wireless communication when transmitting and receiving the audio data between electronic devices.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
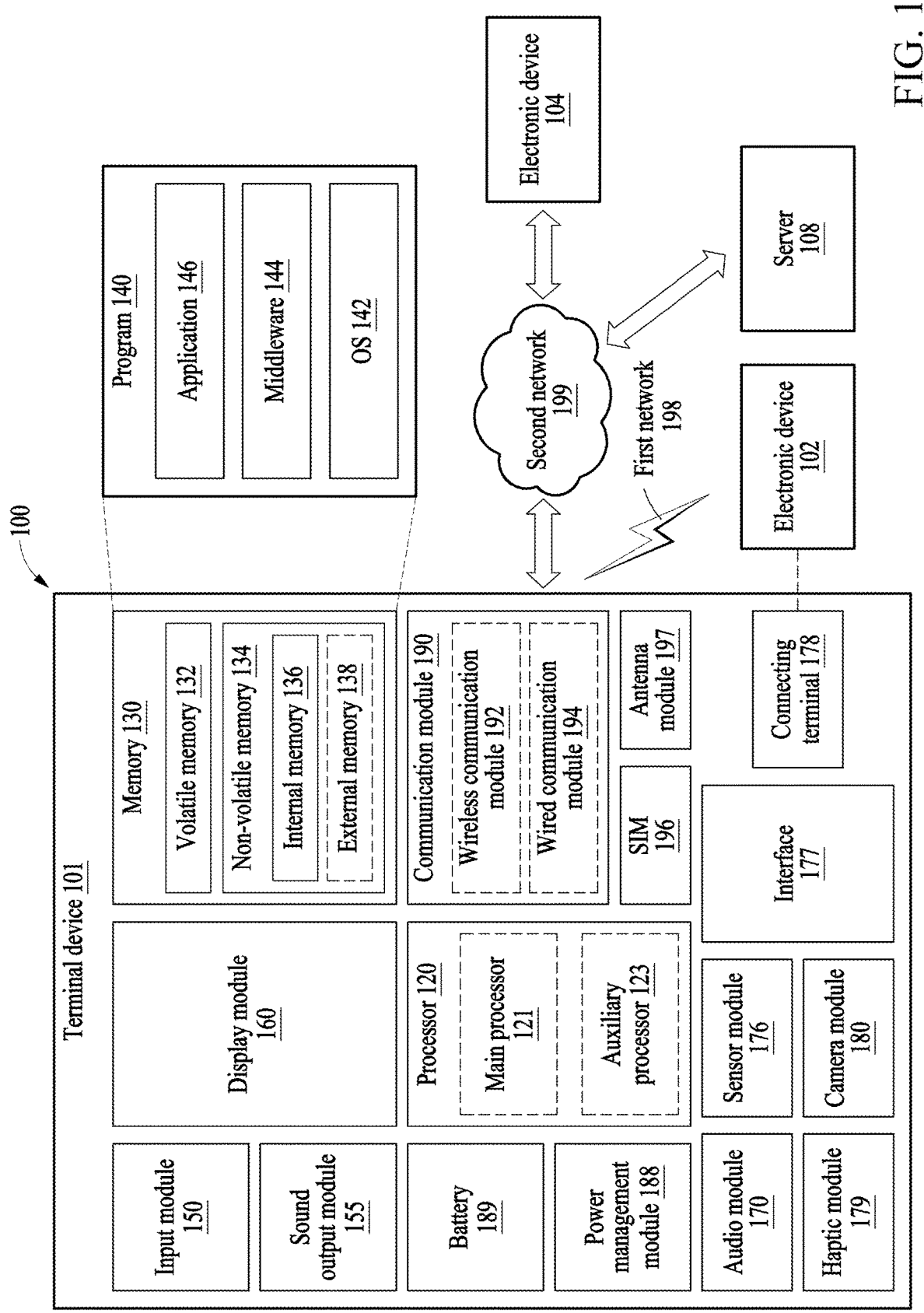
FIG. 1 is a block diagram illustrating an example terminal device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating a terminal device 101 in a network environment 100 according to various example embodiments. Referring to FIG. 1, the terminal device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the terminal device 101 may communicate with the electronic device 104 via the server 108. According to an example embodiment, the terminal device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the terminal device 101, or one or more other components may be added in the terminal device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the terminal device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the terminal device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the terminal device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the terminal device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the terminal device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the terminal device 101, from the outside (e.g., a user) of the terminal device 101. The input module 150 may include, for example, a microphone, a mouse, a keyboard, a key (e.g., a button), or a digital pen (e.g., a stylus pen).

The sound output module 155 may output a sound signal to the outside of the terminal device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the terminal device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the terminal device 101.

The sensor module 176 may detect an operational state (e.g., power or temperature) of the terminal device 101 or an environmental state (e.g., a state of a user) external to the terminal device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the terminal device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the terminal device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the terminal device 101. According to an example embodiment, the power management module 188 may be implemented as, for example, at least a part of a power management integrated circuit (PMIC).

The battery 189 may supply power to at least one component of the terminal device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the terminal device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the terminal device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the terminal device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the terminal device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the terminal device 101 and the external electronic device 104 via the server 108 coupled with the second network 199. Each of the external electronic devices 102 and 104 may be a device of the same type as or a different type from the terminal device 101. According to an example embodiment, all or some of operations to be executed by the terminal device 101 may be executed at one or more of the external electronic devices 102, 104, and 108. For example, if the terminal device 101 is to perform a function or a service automatically, or in response to a request from a user or another device, the terminal device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the terminal device 101. The terminal device 101 may provide the outcome, with or without further processing of the outcome, as at least part of a reply to the request. To that end, a cloud computing, distributed computing, mobile edge computing (MEC), or client-server computing technology may be used, for example. The terminal device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The terminal device 101 may be applied to intelligent services (e.g., smart home, smart city, smart car, or healthcare) based on 5G communication technology or IoT-related technology.

Figure 2:
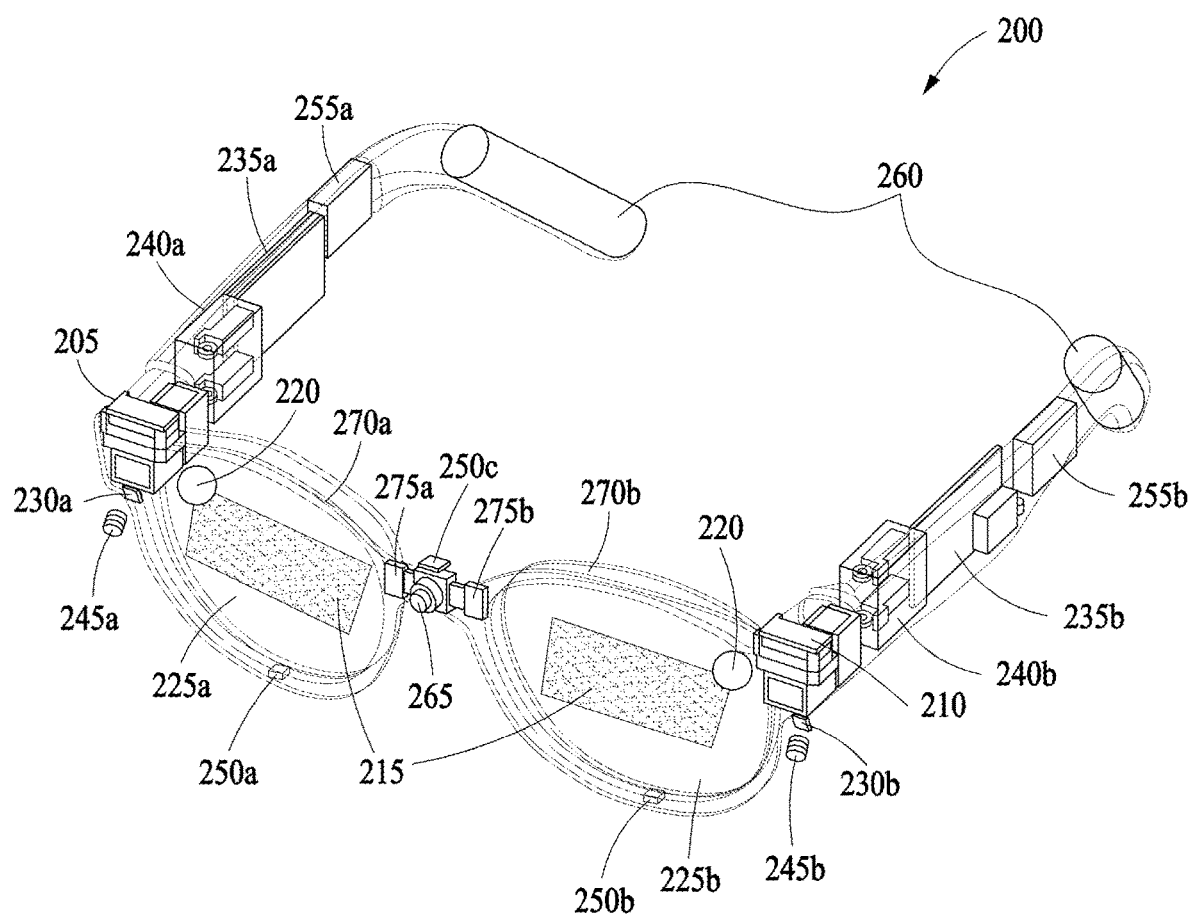
FIG. 2 illustrates a structure of a wearable augmented reality (AR) device according to an example embodiment.

FIG. 2 illustrates a structure of a wearable augmented reality (AR) device according to an example embodiment.

Referring to FIG. 2, a wearable AR device 200 may be worn on a face of a user and may provide the user with a video related to an AR service and/or a virtual reality (VR) service.

In an example embodiment, the wearable AR device 200 may include a first display 205, a second display 210, a screen display unit 215, an input optical member 220, a first transparent member 225a, a second transparent member 225b, an illumination unit 230a, 230b, a first PCB 235a, a second PCB 235b, a first hinge 240a, a second hinge 240b, a first camera 245a, 245b, a plurality of microphones (e.g., a first microphone 250a, a second microphone 250b, a third microphone 250c), a plurality of speakers (e.g., a first speaker 255a, a second speaker 255b), a battery 260, a second camera 275a, 275b, a third camera 265, and a visor 270a, 270b.

In an example embodiment, a display (e.g., the first display 205 and the second display 210) may include, for example, a liquid crystal display (LCD), a digital mirror device (DMD), a liquid crystal on silicon (LCoS), an organic light emitting diode (OLED), or a micro light emitting diode (micro LED). Although not illustrated, when the display is configured as one of a liquid display device, a digital mirror display device, and a silicon liquid display device, the wearable AR device 200 may include a light source that irradiates light to a screen output area of the display. In another example embodiment, when the display is capable of self-generating light, for example, is configured as one of an OLED or a micro LED, the wearable AR device 200 may provide a good quality virtual video to the user without including a separate light source. In an example embodiment, when the display is implemented as an OLED or a micro LED, the light source is not required and the wearable AR device 200 may be reduced in weight accordingly. Hereinafter, the display capable of self-generating light is referred to as a self-luminous display and description is made on the premise of the self-luminous display.

The display (e.g., the first display 205 and the second display 210) according to various example embodiments may include at least one micro LED. For example, the micro LED may express red (R), green (G), and blue (B) through self-luminescence and, due to its small size (e.g., 100 μm or less), a single chip may implement a single pixel (e.g., one of R, G, and B). Therefore, when the display is configured as the micro LED, the display may provide high resolution without a backlight unit (BLU).

Without being limited thereto, a single pixel may include R, G, and B, and a plurality of pixels each including R, G, and B may be implemented.

In an example embodiment, the display (e.g., the first display 205 and the second display 210) may include light receiving pixels (e.g., photo sensor pixels) configured to receive light reflected from an eye provided between a display area including pixels for displaying a virtual video and the pixels and to convert the light to electrical energy and output the same.

In an example embodiment, the wearable AR device 200 may detect a gaze direction (e.g., a pupil movement) of the user through the light receiving pixels. For example, the wearable AR device 200 may detect and track a gaze direction of a right eye of the user and a gaze direction of a left eye of the user through one or more light receiving pixels that constitute the first display 205 and one or more light receiving pixels that constitute the second display 210. The wearable AR device 200 may determine a position of the center of the virtual video along the gaze directions (e.g., directions in which pupils of the right eye and the left eye of the user gaze) of the right eye and the left eye of the user detected through the one or more light receiving pixels.

In an example embodiment, the light emitted from the display (e.g., the first display 205 and the second display 210) may pass through a lens (not shown) and a waveguide and may reach the screen display unit 215 formed on the first transparent member 225a provided to face the right eye of the user and the screen display unit 215 formed on the second transparent member 225b provided to face the left eye of the user. For example, the light emitted from the display (e.g., the first display 205 and the second display 210) may be reflected from a grating area formed on the input optical member 220 and the screen display unit 215 through the waveguide and may be delivered to the eyes of the user. The first transparent member 225a and/or the second transparent member 225b may be formed of a glass plate, a plastic plate, or polymer, and may be made transparent or translucent.

In an example embodiment, the lens (not shown) may be provided on the front surface of the display (e.g., the first display 205 and the second display 210). The lens (not shown) may include a concave lens and/or a convex lens. For example, the lens (not shown) may include a projection lens or a collimation lens.

In an example embodiment, the screen display unit 215 or the transparent member (e.g., the first transparent member 225a, the second transparent member 225b) may include a lens including a waveguide, or a reflective lens.

In an example embodiment, the waveguide may be made of glass, plastic, or polymer, and may include a nano pattern formed on one surface of an inside or outside, for example, a grating structure in a polygonal shape or a curved shape. According to an example embodiment, light incident to one end of the waveguide may be propagated inside a display waveguide by the nano pattern and thereby provided to the user. In an example embodiment, the waveguide configured as a free-form type prism may provide the incident light to the user through a reflective mirror. The waveguide may include at least one diffractive element, for example, at least one of a diffractive optical element (DOE), a holographic optical element (HOE), and a reflective element (e.g., a reflective mirror). In an example embodiment, the waveguide may guide the light emitted from the first display 205 and the second display 210 to the eyes of the user using at least one diffractive element or reflective element included in the waveguide.

According to various example embodiments, the diffractive element may include the input optical member 220/output optical member (not shown). For example, the input optical member 220 may represent an input grating area and an output optical member (not shown) may represent an output grating area. The input grating area may function as an input end to deliver the light emitted from the display (e.g., the first display 205 and the second display 210) (e.g., a micro LED) to the transparent member (e.g., the first transparent member 225a, the second transparent member 225b) of the screen display unit 215. The output grating area may function as an exit to diffract (or reflect) the light delivered to the transparent member (e.g., the first transparent member 225a, the second transparent member 225b) of the waveguide to the eyes of the user.

According to various example embodiments, the reflective element may include a total reflection optical element or a total reflection waveguide for a total internal reflection (TIR). For example, the TIR may refer to a single scheme of guiding light and may represent generating an incident angle such that the light (e.g., a virtual video) input through the input grating area may be 100% reflected from one surface (e.g., a specific surface) of the waveguide and making it sure to deliver the light to the output grating area by 100%.

In an example embodiment, the light emitted from the first display 205, the second display 210 may be guided to the waveguide through an optical path of the input optical member 220. The light that moves inside the waveguide may be guided toward the eyes of the user through the output optical member. The screen display unit 215 may be determined based on the light emitted in the eye direction.

In an example embodiment, the first camera 245a, 245b may include a camera used for head tracking of 3 degrees of freedom (3DoF) or 6DoF, head detection and tracking, gesture, and/or spatial recognition. For example, the first camera 245a, 245b may include a global shutter (GS) camera to detect a movement of a head and a hand and to track the movement.

For example, a stereo camera may be applied to the first camera 245a, 245b for head tracking and spatial recognition and cameras of the same standard and the same performance may be applied to the first camera 245a, 245b. The first camera 245a, 245b may use the GS camera with excellent performance (e.g., image dragging) to detect and track a fast hand gesture and a minute movement such as a finger.

According to various example embodiments, the first camera 245a, 245b may use a rolling shutter (RS) camera. The first camera 245a, 245b may perform a simultaneous localization and mapping (SLAM) function through spatial recognition and depth capturing for 6DoF. The first camera 245a, 245b may perform a user gesture recognition function.

In an example embodiment, the second camera 275a, 275b may be used to detect and track a pupil. The second camera 275a, 275b may be referred to as an eye tracking (ET) camera. The second camera 275a, 275b may track a gaze direction of the user. The wearable AR device 200 may guide a center of a virtual video projected onto the screen display unit 215 to be positioned in a direction in which the pupil of the user gazes based on the gaze direction of the user.

The GS camera may be used such that the second camera 275a, 275b for tracking the gaze direction may detect a pupil and track a fast movement of the pupil. The second cameras 275a and 275b may be installed for the left eye and the right eye, respectively and cameras with the same performance and standard may be used for the second camera 275b for the left eye and the second camera 275a for the right eye.

In an example embodiment, the third camera 265 may be referred to as a high resolution (HR) or a photo video (PV) and may include a high-resolution camera. The third camera 265 may include a color camera with functions for acquiring a high-quality video, such as an auto focus (AF) function and an optical image stabilizer (OIS). Without being limited thereto, the third camera 265 may include a GS camera or an RS camera.

In an example embodiment, at least one sensor (e.g., a gyro sensor, an accelerometer, a geomagnetic sensor, a touch sensor, an illumination sensor and/or a gesture sensor) and the first camera 245a, 265b may perform at least one of head tracking for 6DoF, pose estimation & prediction, gesture and/or a SLAM function through spatial recognition and depth capturing.

In another example embodiment, the first camera 245a, 245b may be used separately as a camera for head tracking and a camera for hand tracking.

In an example embodiment, the illumination unit 230a, 230b may have a different use depending on an installation position. For example, the illumination unit 230a, 230b may be attached with the first camera 245a, 245b mounted around the hinge (e.g., the first hinge 240a, the second hinge 240b) that connects a frame and a template or a bridge that connects the frame. In the case of capturing with the GS camera, the illumination unit 230a, 230b may be used as a method to supplement ambient brightness. For example, when it is not easy to detect a subject to be captured due to a dark environment or mixture of a plurality of light sources and reflected light, the illumination unit 230a, 230b may be used.

In an example embodiment, the illumination unit 230a, 230b attached around the frame of the wearable AR device 200 may be used an auxiliary method to easily detect a gaze direction (an eye gaze) when capturing the pupil with the second camera 275a, 275b. When the illumination unit 230a, 230b is used as the auxiliary method to detect the gaze direction, the illumination unit 230a, 230b may include an infrared (IR) LED of an infrared wavelength.

In an example embodiment, the PCB (e.g., the first PCB 235a, the second PCB 235b) may include a processor (not shown), a memory (not shown), and communication module (not shown) that control components of the wearable AR device 200. The communication module may be configured in the same manner as the communication module 190 of FIG. 1. The same description related to the communication module 190 may apply to the communication module. For example, the communication module may support establishing a direct (e.g., wired) communication channel or a wireless communication channel between the wearable AR device 200 and an external electronic device and performing communication through the established communication channel. The PCB may deliver electrical signals to the components that constitute the wearable AR device 200.

The communication module (not shown) may include one or more communication processors that are operable independently of the processor and that support a direct (e.g., wired) communication or a wireless communication. According to an example embodiment, the communication module (not shown) may include a wireless communication module (e.g., a cellular communication module, a short-range wireless communication module, or a GNSS communication module) or a wired communication module (e.g., a LAN communication module or a power line communication module). A corresponding communication module (not shown) among these communication modules may communicate with an external electronic device via a short-range communication network, such as Bluetooth™, Wi-Fi direct, or infrared data association (IrDA) or a long-range communication network, such as a legacy cellular network, a 5G network, a next-generation communication network, the Internet, or a computer network (e.g., a LAN or a WAN). These various types of communication modules may be implemented as a single component (e.g., a single chip), or may be implemented as multi components (e.g., multi chips) separate from each other.

The wireless communication module may support a 5G network after a 4G network, and a next-generation communication technology, e.g., a NR access technology. The NR access technology may support enhanced mobile broadband (eMBB), terminal power minimization and massive machine type communications (mMTC), or ultra-reliable and low-latency communications (URLLC). The wireless communication module may support a high-frequency band (e.g., a mmWave band) to achieve, e.g., a high data transmission rate. The wireless communication module may support various technologies for securing performance on a high-frequency band, such as, e.g., beamforming, massive multiple-input and multiple-output (MIMO), full dimensional MIMO (FD-MIMO), an array antenna, analog beam-forming, or a large-scale antenna The wearable AR device 200 may further include an antenna module (not shown). The antenna module may transmit or receive a signal or power to or from the outside (e.g., an external terminal device). According to an example embodiment, the antenna module may include an antenna including a radiator formed in a conductor or a conductive pattern formed on a substrate (e.g., the first PCB 235a, the second PCB 235b). According to an example embodiment, the antenna module may include a plurality of antennas (e.g., an array antenna).

In an example embodiment, the plurality of microphones (e.g., the first microphone 250a, the second microphone 250b, the third microphone 250c) may process an external sound signal to electrical voice data. The processed voice data may be variously used according to a function (or an executed application) being performed by the wearable AR device 200.

In an example embodiment, the plurality of speakers (e.g., the first speaker 255a, the second speaker 255b) may output audio data received from the communication module or stored in the memory.

In an example embodiment, at least one battery 260 may be included and the battery 260 may supply power to the components of the wearable AR device 200.

In an example embodiment, the visor 270a, 270b may adjust a transmittance of external light incident to eyes of the user according to the transmittance. The visor 270a, 270b may be positioned in front of or behind the screen display unit 215. The front of the screen display unit 215 may refer to a direction opposite to a side of the user that wears the wearable AR device 200, that is, a direction toward the user that wears the wearable AR device 200. The visor 270a, 270b may protect the screen display unit 215 and may adjust the transmittance of the external light.

For example, the visor 270a, 270b may include an electrochromic element configured to adjust the transmittance through a change in color according to the applied power. Here, electrochromism refers to a phenomenon that color changes due to occurrence of an oxidation-reduction reaction by the applied power. The visor 270a, 270b may adjust the transmittance of the external light using a change in color of the electrochromic element.

For example, the visor 270a, 270b may include a control module and an electrochromic element. The control module may adjust the transmittance of the electrochromic element by controlling the electrochromic element.

Figure 3:
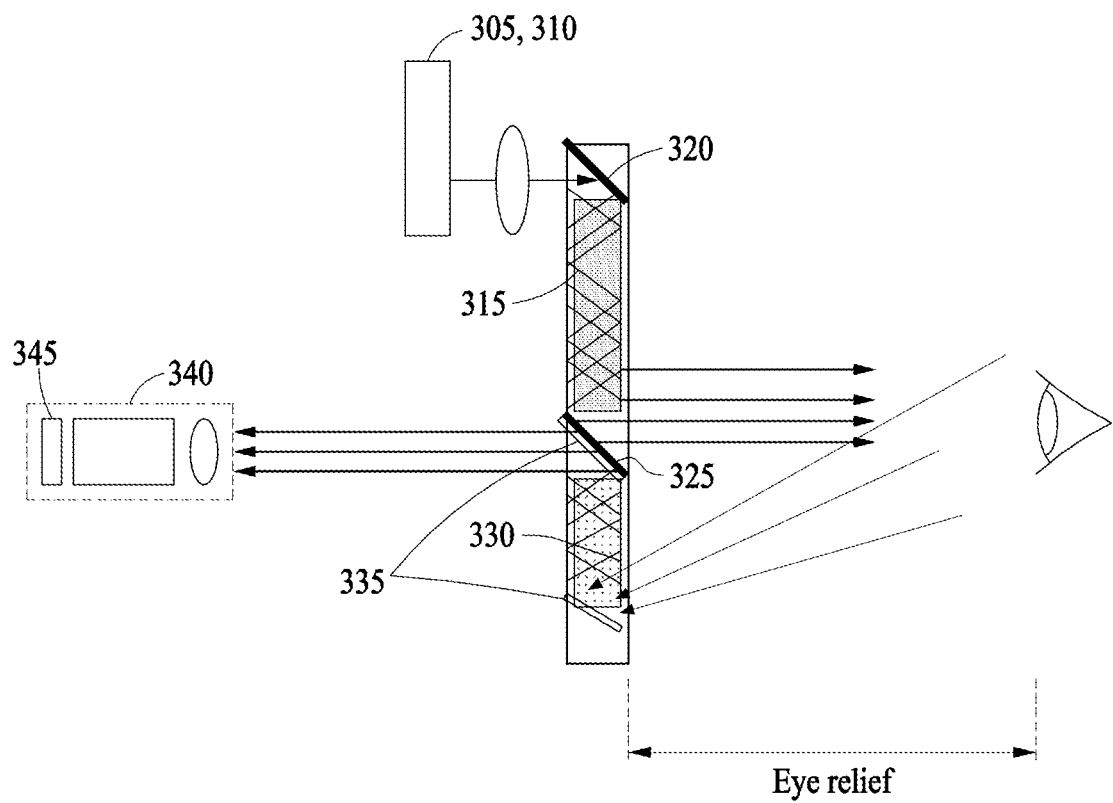
FIG. 3 illustrates a camera and a gaze tracking sensor of a wearable AR device according to an example embodiment.

FIG. 3 illustrates a camera and a gaze tracking sensor of a wearable AR device according to an example embodiment.

Referring to FIG. 3, the wearable AR device (e.g., the wearable AR device 200 of FIG. 2) according to an example embodiment may include a display 305, 310 (e.g., the first display 205, the second display 210 of FIG. 2), an optical waveguide (or a waveguide) 315, an input optical member 320 (e.g., the input optical member 220 of FIG. 2), an output optical member 325, an ET optical waveguide (or an ET waveguide) 330, an ET splitter 335, a camera 340 (e.g., the second camera 275a, 275b), a gaze tracking sensor 345, and an illumination unit (e.g., the illumination unit 230a, 230b of FIG. 2).

Referring to FIG. 3, it can be verified that light output from the display 305, 310 of the wearable AR device is input to the input optical member 320 and transmitted from the output optical member 325 to an eye of the user through the optical waveguide 315.

Referring to FIG. 3, the camera 340 may acquire a video from the eye of the user. For example, the video of the eye of the user may be input to a lower ET splitter 335 and transmitted to an upper ET splitter 335 through the ET optical waveguide 330. The camera 340 may acquire the video of the eye of the user from the upper ET splitter 335.

The illumination unit according to an example embodiment may output IR light to a pupil area of the user. The IR light may be reflected from the pupil of the user and transmitted to the ET splitter 335 with the video of the eye of the user. The video of the eye acquired by the camera 340 may include the reflected IR light. The gaze tracking sensor 345 may detect the reflected light of the IR light reflected from the pupil of the user.

Figure 4:
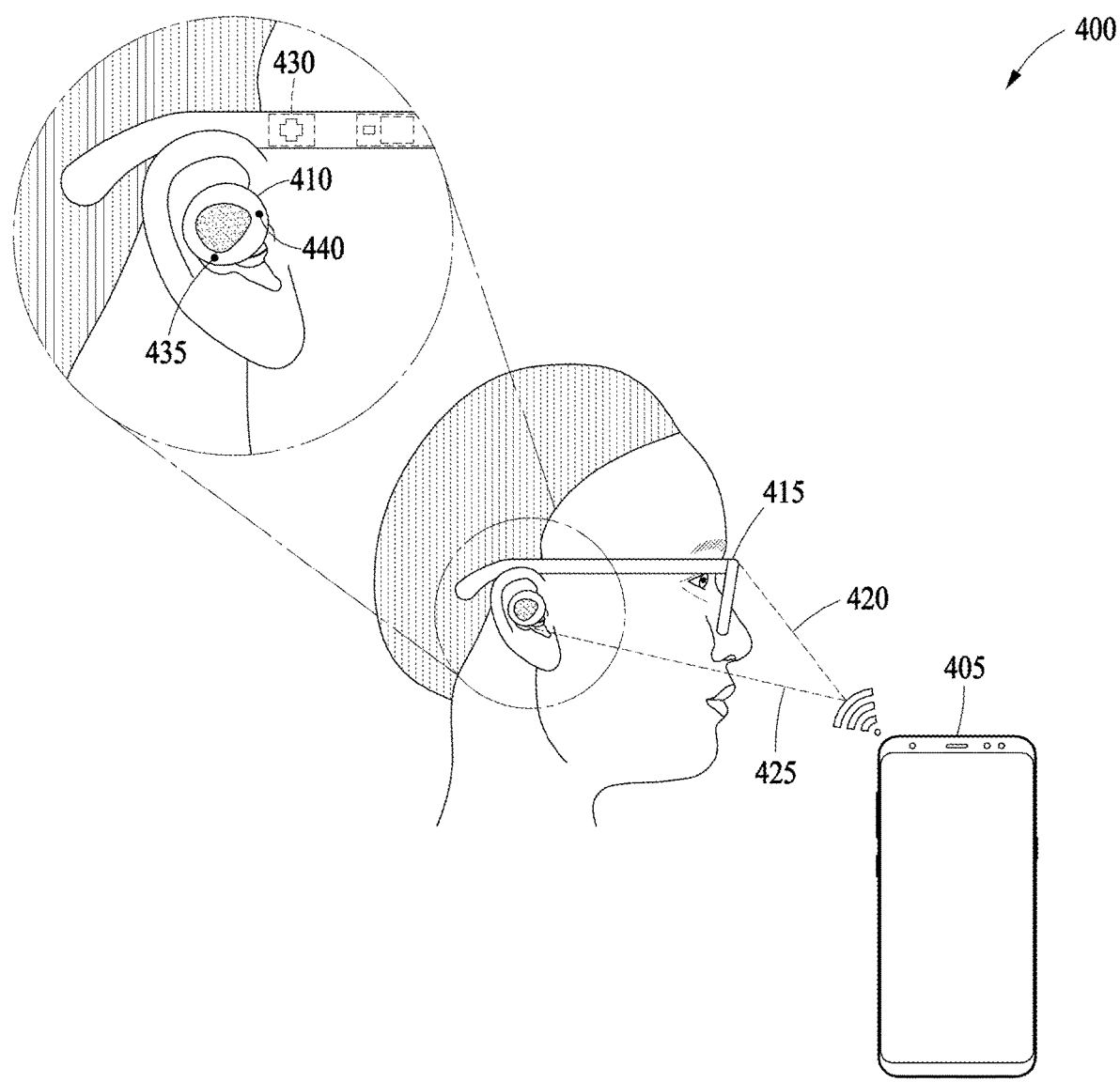
FIG. 4 illustrates an example of an electronic system for video and audio synchronization according to an example embodiment.

FIG. 4 illustrates an example of an electronic system for video and audio synchronization according to an example embodiment.

Referring to FIG. 4, an electronic system 400 for video and audio synchronization includes a terminal device 405 (e.g., the terminal device 101 of FIG. 1) configured to execute an application and to generate audio data and video data related to the application, a wearable audio device 410 configured to receive the audio data from the terminal device 405 through a first wireless communication scheme 425 and to output the received audio data, and an AR device 415 (e.g., the wearable AR device 200 of FIG. 2) configured to receive the audio data and the video data from the terminal device 405 through a second wireless communication scheme 420 and to output the received audio data and video data.

The terminal device 405 may execute the application and may generate the audio data and the video data related to the application. The generated audio data may be transmitted to the wearable audio device 410. The wearable audio device 410 may be worn on an ear of the user and may output the audio data to the ear of the user. Since the audio data is output through a speaker (not shown) of the wearable audio device 410, the user may hear sound.

The video data generated by the terminal device 405 may be transmitted to the wearable AR device 415 to be viewed by the user with eyes and may be output through a display (e.g., the first display 205 and the second display 210 of FIG. 2) of the wearable AR device 415. The audio data generated by the terminal device 405 may be further transmitted to the wearable AR device 415. A detailed operation method is described below with reference to FIG. 5.

Although convenience may be improved compared to a wired communication in such a manner that the terminal device 405 wirelessly communicates with the wearable AR device 415 and the wearable audio device 410, it may be difficult to synchronize video and audio. For example, when the terminal device 405 transmits the audio data to the wearable audio device 410 using the first wireless communication scheme 425 (e.g., a Bluetooth communication) and transmits the video data to the wearable AR device 415 using the second wireless communication scheme 420 (e.g., a WiFi communication) having a delay time less than that of the first wireless communication scheme 425, the video data and the audio data may not be simultaneously output from the wearable AR device 415 and the wearable audio device 410 due to delay of the audio data. As another example, when the terminal device 405 transmits the audio data to the wearable audio device 410 using the second wireless communication scheme 420 (e.g., a WiFi communication) and transmits the video data to the wearable AR device 415 using the second wireless communication scheme 420 (e.g., a WiFi communication), the video data and the audio data may not be simultaneously output from the wearable AR device 415 and the wearable audio device 410 due to a communication environment, such as a transmission bandwidth or signal interference.

Out-of-synchronization between the video data and the audio data may cause a user of the electronic system 400 to feel uncomfortable. When the application is an application that provides 3D content responding to a movement of the user, such as AR content and/or VR content, the wearable AR device 415 may perform head tracking in response to a movement or a rotation of a face of the user, and, based on this, a viewpoint of a video output to the display of the wearable AR device 415 may need to move or rotate together. Also, the audio data may provide spatial audio and a direction and magnitude of sound output from the wearable audio device 410 may need to be changed. In the above process, when the video data of the wearable AR device 415 and the audio data of the wearable audio device 410 are not synchronized or when a delay time of the audio data increases, the user may feel more uncomfortable than in the case of two-dimensional (2D) content due to a time difference between a visual stimulus and an auditory stimulus.

Although the wearable AR device 415 may delay and output the video data for synchronization of the video data and the audio data, it may be unsuitable for an application, such as a game that outputs video and audio in response to an action of the user in real time. A size of a buffer used to receive the audio data may be reduced to decrease the delay time in the wearable audio device 410. Here, in the case of reducing the size of the buffer, audio chopping may occur and quality of sound being output may be degraded.

According to a method for video and audio synchronization and the electronic system 400 in an example embodiment, the audio data may be transmitted to the wearable AR device 415 using the second wireless communication scheme 420 and the audio data may be delivered to the wearable audio device 410 using output of a speaker 430 of the wearable AR device 415. The wearable audio device 410 may receive the audio data that is output from the speaker 430 of the wearable AR device 415 using one or more microphones 435 and 440 of the wearable audio device 410 and may output the received audio data through the microphone 435, 440 of the wearable audio device 410.

In an example embodiment, the wearable AR device 415 may be worn on the face of the user in a form of glasses or a head mounted display (HMD) and the wearable audio device 410 may be worn on the ear of the user in a form of an earphone, a headset, or a headphone. The speaker 430 of the wearable AR device 415 may be provided close to the ear of the user and, when the speaker 430 of the wearable AR device 415 is worn on the face of the user, may be positioned spatially close to the wearable audio device 410 worn on the ear of the user as illustrated in FIG. 4. The wearable audio device 410 is positioned spatially close to the speaker 430 of the wearable AR device 415. Therefore, although sound output from the speaker 430 of the wearable AR device 415 is not loud, the wearable audio device 410 can receive the audio data through the microphone 435, 440.

The method and the electronic system 400 according to an example embodiment may reduce the delay time used by output of the audio data in the wearable audio device 410 and perform synchronization with the video data of the wearable AR device 415 by delivering the audio data without using the first wireless communication scheme 425 having a greater delay time.

Hereinafter, the method for video and audio synchronization is further described with reference to FIG. 5.

Figure 5:
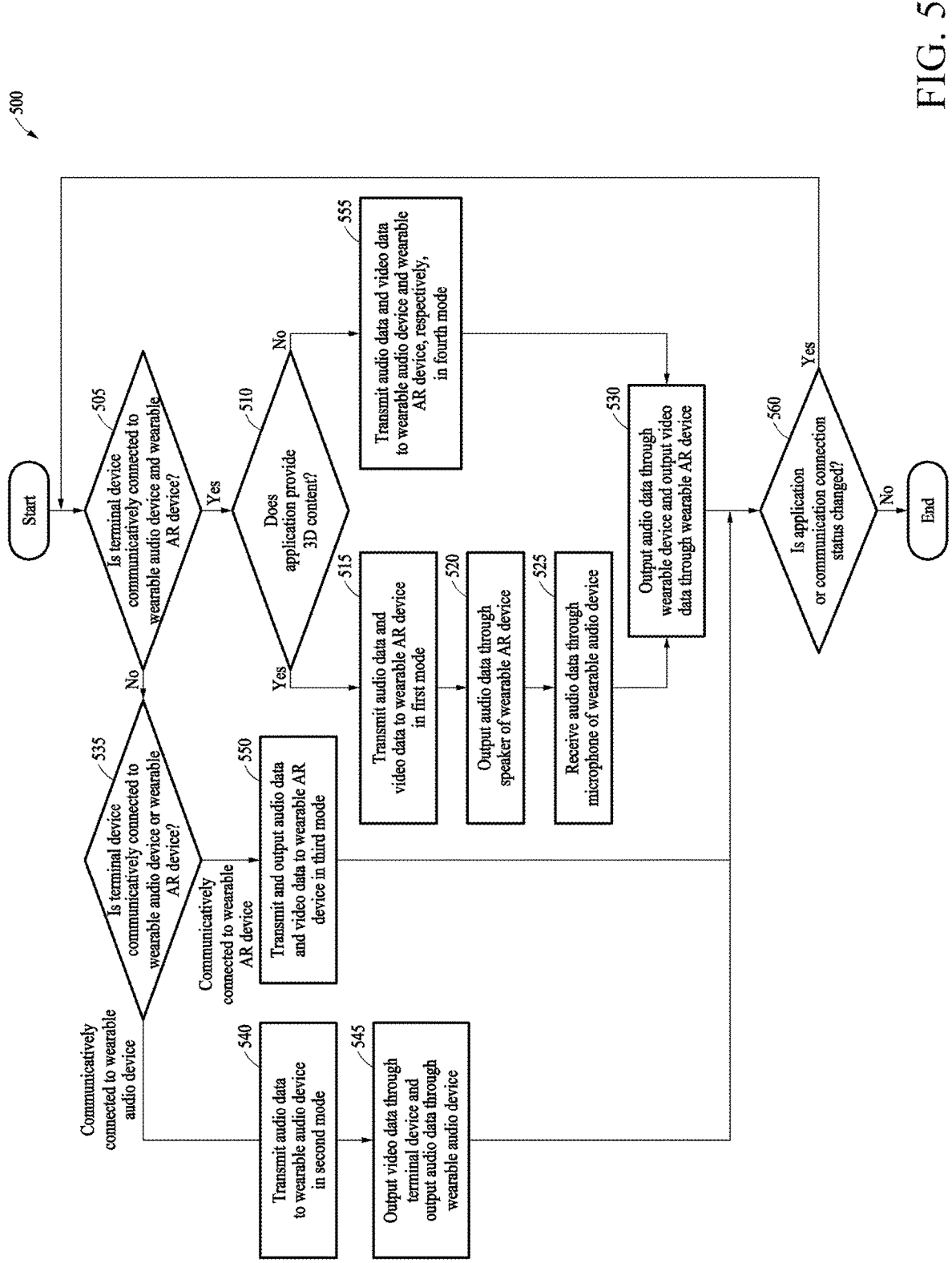
FIG. 5 is a flowchart illustrating a method for video and audio synchronization according to an example embodiment.

FIG. 5 is a flowchart illustrating a method 500 for video and audio synchronization according to an example embodiment.

Referring to FIG. 5, the electronic system 400 may determine an operation mode based on a communication connection status between the terminal device 405 and the wearable AR device 415, a communication connection status between the terminal device 405 and the wearable audio device 410, and content provided from an application executed by the electronic system 400. Each operation mode may correspond to a delivery path of audio data between the respective devices of the electronic system 400. According to the operation mode, delivery paths of audio data between the terminal device 405 and the wearable AR device 415 and the wearable audio device 410 may be set in the electronic system 400, and the audio data may be delivered and output through the corresponding delivery path. According to a change in the delivery path of the audio data, a delay time used to output the audio data may vary.

In operation 505, the electronic system 400 may determine whether the terminal device 405 is communicatively connected to the wearable audio device 410 and the wearable AR device 415.

When the terminal device 405 is communicatively connected to the wearable audio device 410 and the wearable AR device 415, the electronic system 400 may determine whether the application executed by the electronic system 400 is an application that provides 3D content, such as VR content and AR content in operation 510.

When the application provides the 3D content, the user may feel discomfort due to out-of-synchronization between video data of the wearable AR device 415 and audio data of the wearable audio device 410 or a long delay time of the audio data. Therefore, to minimize this, the delay time of the audio data may need to be reduced. To reduce user discomfort, when the application provides the 3D content, the electronic system 400 may determine an operation mode of the electronic system 400 as a first mode with a shorter delay time until audio data output in operation 515.

In the first mode, the electronic system 400 may transmit the audio data and the video data generated by the terminal device 405 to the wearable AR device 415 through the second wireless communication scheme 420 having a delay time less than that of the first wireless communication scheme 425. In the first mode, the wearable AR device 415 may deliver the audio data to the wearable audio device 410 through the speaker 430. The first mode may be a mode for delivering the audio data using the speaker 430 of the wearable AR device 415 and the microphone 435, 440. of the wearable audio device 410. When the operation mode is determined as the first mode, the terminal device 405 may control the wearable audio device 410 and the wearable AR device 415 such that the electronic system 400 may operate in the first mode.

In operation 520, the electronic system 400 may output the received audio data as sound through the speaker 430 of the wearable AR device 415. In operation 525, the electronic system 400 may receive the audio data that is output from the speaker 430 of the wearable AR device 415 through the microphone 435, 440 of the wearable audio device 410.

In operation 530, the electronic system 400 may output the audio data that is received from the wearable audio device 410 through the speaker of the wearable audio device 410 and may output the video data through the display of the wearable AR device 415. The user may wear the wearable audio device 410 on the ear and may hear the sound output through the speaker of the wearable audio device 410, and may wear the wearable AR device 415 on the face and may view video output on the display of the wearable AR device 415.

In the first mode, since the audio data is delivered to the wearable AR device 415 using the second wireless communication scheme 420 without using the first wireless communication scheme 425 having a delay time greater than that of the second wireless communication scheme 420 and is delivered from the wearable AR device 415 to the wearable audio device 410 using the speaker 430 and the microphone (not shown), the delay time may be reduced compared to audio data delivery by the first wireless communication scheme 425. In the first mode, since the audio delay time is reduced, the video data output from the wearable AR device 415 and the audio data output from the wearable audio device 410 may be substantially simultaneously output to such an extent that the user does not notice the delay time between the video data and the audio data.

When it is determined that the application is not the application that provides the 3D content in operation 510, the electronic system 400 may determine the operation mode as a fourth mode in operation 555. The fourth mode may refer to a mode in which the audio data is transmitted from the terminal device 405 to the wearable audio device 410 using the first wireless communication scheme 425 and the video data is transmitted from the terminal device 405 to the wearable AR device 415 using the second wireless communication scheme 420.

In the fourth mode, the electronic system 400 may transmit the audio data generated by the terminal device 405 to the wearable audio device 410 using the first wireless communication scheme 425 and may transmit the video data generated by the terminal device 405 to the wearable AR device 415 using the second wireless communication scheme 420. When the application does not provide the 3D content, user discomfort caused by the delay time of the audio data may be relatively less and thus, the audio data may be transmitted from the terminal device 405 to the wearable audio device 410 using the first wireless communication scheme 425. When using the first wireless communication scheme 425, a size of a buffer used to receive the audio data may be reduced to reduce the delay time in the wearable audio device 410.

When it is determined that the terminal device 405 is not communicatively connected to the wearable AR device 415 and the wearable audio device 410 in operation 505, the electronic system 400 may determine whether the terminal device 405 is communicatively connected to one of the wearable AR device 415 and the wearable audio device 410 in operation 535.

When the terminal device 405 is communicatively connected to the wearable audio device 410 and is not communicatively connected to the wearable AR device 415, the terminal device 405 may determine the operation mode as a second mode in operation 540. The second mode may be a mode for transmitting the audio data from the terminal device 405 to the wearable audio device 410 through the first wireless communication scheme 425 and outputting the video data to the display of the terminal device 405. In the second mode, the audio data generated by the terminal device 405 may be transmitted to the wearable audio device 410 through the first wireless communication scheme 425. When using the first wireless communication scheme 425, the size of the buffer used to receive the audio data may be reduced to reduce the delay time in the wearable audio device 410.

In operation 545, the terminal device 405 may output the video data generated by the terminal device 405 through the display and the wearable audio device 410 and may output the received audio data through the speaker of the wearable audio device 410. The user may view video that is output through the display of the terminal device 405 and may hear the sound that is output through the speaker of the wearable audio device 410.

When it is determined that the terminal device 405 is communicatively connected to the wearable AR device 415 and is not communicatively connected to the wearable audio device 410 in operation 535, the terminal device 405 may determine the operation mode as a third mode in operation 550. The third mode may be a mode for transmitting the video data and the audio data to the wearable AR device 415 through the second wireless communication scheme 420, outputting the video data through the display of the wearable AR device 415, and outputting the audio data through the speaker 430 of the wearable AR device 415.

In the third mode, the terminal device 405 may transmit the video data and the audio data generated by the terminal device 405 to the wearable AR device 415 through the second wireless communication scheme 420. The wearable AR device 415 that receives the video data and the audio data may output the video data through the display of the wearable AR device 415 and may output the audio data through the speaker 430 of the wearable AR device 415. In the third mode, since the video data and the audio data are output from a single device, the video data and the audio data may be output through synchronization thereof. According to an example embodiment, a volume output through the speaker 430 of the wearable AR device 415 in the first mode may differ from a volume output through the speaker 430 of the wearable AR device 415 in the third mode. For example, the volume output in the third mode may be greater than the volume output in the first mode.

In operation 560, the terminal device 405 may determine whether the executed application is changed or whether the communication connection status between the terminal device 405 and the wearable AR device 415 and the communication connection status between the terminal device 405 and the wearable audio device 410 are changed. When any one of the executed application, the communication connection status between the terminal device 405 and the wearable AR device 415, and the communication connection status between the terminal device 405 and the wearable audio device 410 is changed, the electronic system 400 may return to operation 505 and may determine again the operation mode of the electronic system 400. When there is no change in the executed application, the communication connection status between the terminal device 405 and the wearable AR device 415, and the communication connection status between the terminal device 405 and the wearable audio device 410, the electronic system 400 may maintain a current operation mode.

Hereinafter, an audio data delivery path in each operation mode is described with reference to FIG. 6.

Figure 6:
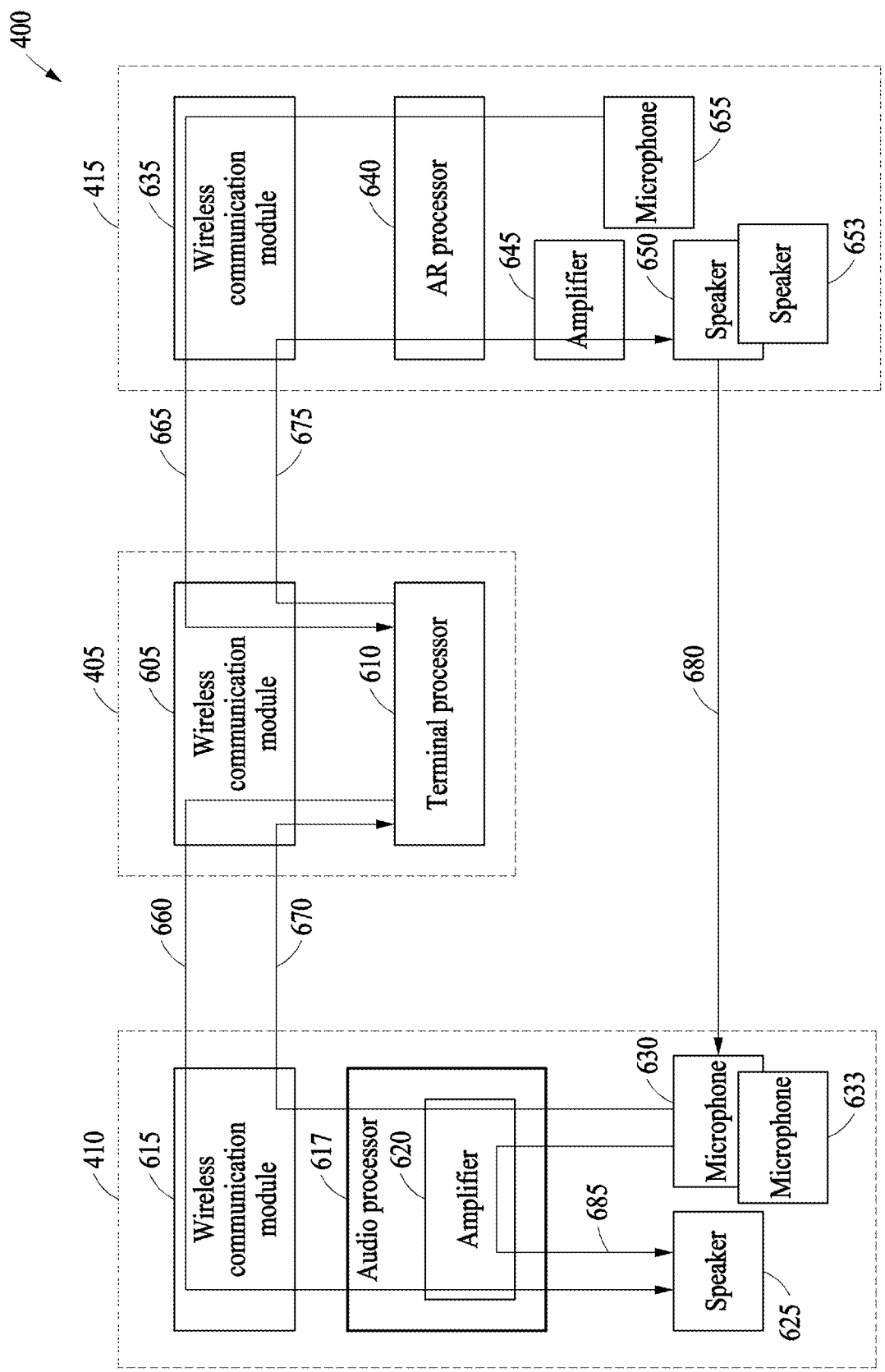
FIG. 6 is a block diagram illustrating an audio data delivery path of an electronic system according to an example embodiment.

FIG. 6 is a block diagram illustrating an audio data delivery path of an electronic system according to an example embodiment.

FIG. 6 illustrates a portion of the terminal device 405, the wearable AR device 415, and the wearable audio device 410 included in the electronic system 400 and delivery paths 660, 665, 670, 675, 680, and 685 of audio data.

The wearable audio device 410 according to an example embodiment may include a wireless communication module 615 for wireless communication of the first wireless communication scheme 425, a speaker 625, a microphone 630, 633 (e.g., the microphone 435, 440 of FIG. 4), and an audio processor 617 that includes an amplifier 620. The audio processor 617 may communicate with the terminal device 405 using the first wireless communication scheme 425 through the wireless communication module 615. The audio processor 617 may control the amplifier 620 to adjust gain of the amplifier 620 and may control the speaker 625 and the microphone 630, 633 to perform beamforming.

The wearable AR device 415 according to an example embodiment may include a wireless communication module 635 for wireless communication of the second wireless communication scheme 420 (e.g., the wireless communication module (not shown) of FIG. 2), an AR processor 640 (e.g., the processor (not shown) of FIG. 2), an amplifier 645, a speaker 650, 653 (e.g., the speaker 430 of FIG. 4), and a microphone 655. The wireless communication module 635 may be included in the communication module (not shown) of FIG. 2. The wearable AR device 415 may communicate with the terminal device 405 using the second wireless communication scheme 420 through the wireless communication module 635.

The terminal device 405 according to an example embodiment may include a terminal processor 610 (e.g., the processor 120 of FIG. 1) and a wireless communication module 605 (e.g., the wireless communication module 192 of FIG. 1). The terminal device 405 may execute an application using the terminal processor 610 and may generate audio data and video data related to the application. The terminal device 405 may communicate with the wearable audio device 410 using the first wireless communication scheme 425 and may communicate with the wearable AR device 415 using the second wireless communication scheme 420, through the wireless communication module 605. The terminal device 405 may transmit the audio data to the wearable audio device 410 using the first wireless communication scheme 425 and may transmit the audio data and the video data to the wearable AR device 415 using the second wireless communication scheme 420.

In the first mode, the audio data generated by the terminal device 405 may be delivered and output along the paths 675, 680, and 685 of FIG. 6. The video data and the audio data generated by the terminal device 405 may be transmitted to the wireless communication module 635 of the wearable AR device 415 through the wireless communication module 605 of the terminal device 405. The wireless communication module 635 of the wearable AR device 415 may receive the video data and the audio data. The video data may be displayed through the display (e.g., the first display 205 and the second display 210 of FIG. 2) of the wearable AR device 415. The audio data may be amplified through the AR processor 640 and the amplifier 645 of the wearable AR device 415 and output through the speaker 650, 653 without using wireless communication to reduce a delay time of audio data transmission. The audio data output through the speaker 650, 653 of the wearable AR device 415 may be propagated in a form of sound as in the path 680 and may be received through the microphone 630, 633 of the wearable audio device 410.

The audio data received by the microphone 630, 633 of the wearable audio device 410 may be amplified through filtering for noise removal at the amplifier 620 connected to the microphone 630, 633. The audio data may be delivered and output from the amplifier 620 to the speaker 625.

The speaker 650, 653 of the wearable AR device 415 and the microphone 630, 633 of the wearable audio device 410 may be positioned in close physical proximity (e.g., the speaker 430 of the wearable AR device 415 and the microphone 435, 440 of the wearable audio device 410 of FIG. 4). Therefore, an amount of time used for the audio data to be received at the microphone 630, 633 of the wearable audio device 410 in a form of sound may be shorter than when using the wireless communication (e.g., Bluetooth™ communication, WiFi communication). Therefore, when the video data and the audio data are output from the wearable AR device 415 and the wearable audio device 410, respectively, the video data and the audio data may be substantially simultaneously output to such an extent that the user does not notice the delay time.

In the first mode, since the wearable audio device 410 receives the audio data using the microphone 630, 633, ambient noise may also be received with the audio data. Also, the audio data is output from the wearable AR device 415 in a form of sound through the speaker 650, 653. Therefore, if it is quiet and there is a person around the wearable AR device 415, the person may hear the output sound. To prevent the other person from hearing the sound, the wearable AR device 415 may detect an ambient noise level through the microphone 655 of the wearable AR device 415 and may adjust gain of the amplifier 645 connected to the speaker 650, 653 of the wearable AR device 415 based on the detected ambient noise level. The wearable AR device 415 may adjust the gain of the amplifier 645 connected to the speaker 650, 653 of the wearable AR device 415 in proportion to the detected ambient noise level. The wearable AR device 415 may set the gain of the amplifier 645 to decrease according to a decrease in the detected ambient noise level and may set the gain of the amplifier 645 to increase according to an increase in the detected ambient noise level.

In a situation in which the ambient noise level is detected as low, a signal noise ratio (SNR) of the audio data received by the microphone 630, 633 of the wearable audio device 410 may be sufficiently large although the gain of the amplifier 620 for output of the audio data is low and sufficiently large output may be provided from the speaker 625 of the wearable audio device 410 through amplification using the amplifier 620 of the wearable audio device 410. In a situation which the ambient noise level is detected as high, the SNR of the audio data received by the microphone 630, 633 of the wearable audio device 410 may not be sufficiently large. Therefore, the gain of the amplifier 645 for the audio data output of the wearable AR device 415 may need to be large.

The wearable AR device 415 may recognize a person from video acquired using the camera (not shown) (e.g., the first camera 245a, 245b of FIG. 2) of the wearable AR device 415 and may adjust gain of the amplifier 645 connected to the speaker 650, 653 of the wearable AR device 415 based on a number of recognized persons. When a large number of persons are detected in the video acquired using the camera, people around the user may hear the sound if the gain of the amplifier 645 connected to the speaker 650, 653 of the wearable AR device 415 increases. To prevent this, the wearable AR device 415 may adjust the gain of the amplifier 645 connected to the speaker 650, 653 to decrease according to an increase in the number of persons detected in the video acquired using the camera.

The gain of the amplifier 620 connected to the microphone 630, 633 of the wearable audio device 410 may be adjusted based on the ambient noise level detected by the wearable AR device 415. The terminal device 405 may receive the ambient noise level detected by the wearable AR device 415 and may adjust the gain of the amplifier 620 connected to the microphone 630, 633 of the wearable audio device 410 based on the received ambient noise level. The terminal device 405 may transmit a control signal for adjusting the gain of the amplifier 620 of the wearable audio device 410 to the wearable audio device 410 using the first wireless communication scheme 425. The wearable audio device 410 may receive the control signal from the terminal device 405 and the audio processor 617 of the wearable audio device 410 may adjust the gain of the amplifier 620 based on the control signal.

According to a decrease in the detected ambient noise level, the gain of amplifier 620 may be set to increase. According to an increase in the detected ambient noise level, the gain of the amplifier 620 may be set to decrease. In a situation in which the ambient noise level is detected as low, the gain of the amplifier 645 for the audio data output of the wearable AR device 415 sets to be low. Therefore, to provide sufficient output for the user to hear sound, the gain of the amplifier 620 connected to the microphone 630, 633 of the wearable audio device 410 may need to be large. In a situation in which the ambient noise level is detected as high, if the gain of the amplifier 620 connected to the microphone 630, 633 of the wearable audio device 410 is set to be large, ambient noise may be amplified. To prevent this, the gain of the amplifier 620 connected to the microphone 630, 633 of the wearable audio device 410 may need to be low.

In the first mode, if the ambient noise level detected through the microphone 655 is greater than or equal to a threshold (e.g., a specific numerical value, such as 20 dB), the wearable AR device 415 may perform beamforming with respect to the microphone 630, 633 of the wearable audio device 410 using two or more speakers 650 and 653 of the wearable AR device 415 to increase an SNR when receiving audio data through the microphones 630 and 633 of the wearable audio device 410.

If the ambient noise level detected through the microphone 655 is greater than or equal to the threshold (e.g., a specific numerical value, such as 20 dB), the terminal device 405 may control the wearable audio device 410 such that two or more microphones 630 and 633 of the wearable audio device 410 may perform beamforming with respect to the speakers 650 and 653 of the wearable AR device 415 to increase an SNR when receiving audio data through the microphones 630 and 633 of the wearable audio device 410. If the ambient noise level detected through the microphone 655 is greater than or equal to the threshold (e.g., a specific numerical value, such as 20 dB), the audio processor 617 of the wearable audio device 410 may be controlled by the terminal device 405 and may perform beamforming with respect to the speakers 650 and 653 of the wearable AR device 415 using two or more microphones 630 and 633.

In the first mode, since the microphone 630, 633 of the wearable audio device 410 is used to receive the audio data output from the wearable AR device 415, the electronic system 400 may receive an audio input through the microphone 655 of the wearable AR device 415. For example, a user voice may be received through the microphone 655 of the wearable AR device 415 and may be transmitted to the terminal device 405 by the wireless communication module 635 through the AR processor 640 along the path 665.

Since the speaker 650, 653 of the wearable AR device 415 and the microphone 630, 633 of the wearable audio device 410 are positioned in close physical proximity, the gain of the amplifier 620 in the first mode may be set to be relatively lower than the gain of the amplifier 620 in the second mode used for the microphone 630, 633 to receive ambient sound. In the first mode, the user voice may be input to the microphone 630, 633 of the wearable audio device 410, but the gain of the amplifier 620 may be set to be relatively low. Therefore, the voice of the user in a signal input to the microphone 630, 633 becomes reduced compared to the sound of the speaker 650, 653 of the wearable AR device 415 and may be removed through noise filtering in the amplifier 620.

In the second mode, the terminal device 405 may be communicatively connected to the wearable audio device 410 using the first wireless communication scheme 425 and may not be communicatively connected to the wearable AR device 415. The audio data generated by the terminal device 405 may be transmitted from the wireless communication module 605 of the terminal device 405 to the wireless communication module 615 of the wearable audio device 410 using the first wireless communication scheme 425 along the path 660. The audio data received by the wearable audio device 410 may be transmitted from the wireless communication module 615 to the amplifier 620 and amplified. The audio data may be transmitted from the amplifier 620 to the speaker 625 and may be output as sound through the speaker 625. In the second mode, the sound input to the microphone 630, 633 may be amplified in the amplifier 620 and may be transmitted to the terminal device 405 along the path 670 using the first wireless communication scheme 425 through the wireless communication module 615.

In the third mode, the terminal device 405 may be communicatively connected to the wearable AR device 415 using the second wireless communication scheme 420 and may not be communicatively connected to the wearable audio device 410. The audio data generated by the terminal device 405 may be transmitted from the wireless communication module 605 of the terminal device 405 to the wireless communication module 635 of the wearable audio device 410 using the second wireless communication scheme 420 along the path 675. The audio data received by the wearable AR device 415 may be delivered from the wireless communication module 635 to the amplifier 645 through the AR processor 640 and amplified. The audio data may be delivered from the amplifier 645 to the speaker 650, 653 and may be output as sound through the speaker 650, 653. In the third mode, the sound input to the microphone 655 may be delivered to the terminal device 405 along the path 665 using the second wireless communication scheme 420 through the wireless communication module 635 by going through the AR processor 640.

In the fourth mode, the terminal device 405 may be communicatively connected to the wearable audio device 410 using the first wireless communication scheme 425 and may be communicatively connected to the wearable AR device 415 using the second wireless communication scheme 420. In the fourth mode, the audio data generated by the terminal device 405 may be transmitted to the wearable audio device 410 through the path 660 as in the second mode and may be output through the speaker 625 of the wearable audio device 410.

In the fourth mode, at least one of the microphone 655 of the wearable AR device 415 and the microphone 630, 633 of the wearable audio device 410 may be used to receive voice of the user. In the fourth mode, the sound input to the microphone 630, 633 of the wearable audio device 410 may be amplified by the amplifier 620 and may be delivered to the terminal device 405 along the path 670 using the first wireless communication scheme 425 through the wireless communication module 615. In the fourth mode, the sound input to the microphone 655 of the wearable AR device 415 may be delivered to the terminal device 405 along the path 665 using the second wireless communication scheme 420 through the wireless communication module 635 by going through the AR processor 640.

The electronic system 400 for outputting video data and audio data according to an example embodiment may include the terminal device 405 configured to generate the audio data and the video data, the wearable audio device 410 configured to communicatively connect to the terminal device 405 through the first wireless communication scheme 425, and the wearable AR device 415 configured to communicatively connect to the terminal device 405 through the second wireless communication scheme 420. When the application is an application that provides 3D content, the wearable AR device 415 may receive the audio data and the video data from the terminal device 405, output the video data through the display of the wearable AR device 415, and output the audio data through the speaker 430 or 650, 653 of the wearable AR device 415, in the first mode. The wearable audio device 410 may receive the audio data output from the wearable AR device 415 from the terminal device 405 using the microphone 435, 440 or 630, 633 of the wearable audio device 410 and may output the audio data received from the wearable AR device 415 through the speaker 625 of the wearable audio device 410.

The second wireless communication scheme 420 may be a scheme having a delay time less than that of the first wireless communication scheme 425.

The terminal device 405 may determine whether the terminal device 405 is communicatively connected to the wearable audio device 410 and the wearable AR device 415, When the terminal device 405 is communicatively connected to the wearable audio device 410 and the wearable AR device 415, the terminal device 405 may determine whether the application is the application that provides the 3D content and, when the application is the application that provides the 3D content, may control the wearable audio device 410 and the wearable AR device 415 such that the electronic system 400 operates in the first mode.

When the terminal device 405 is communicatively connected to the wearable audio device 410 and is not communicatively connected to the wearable AR device 415, the terminal device 405 may transmit the audio data to the wearable audio device 410 through the first wireless communication scheme 425 in the second mode. When the terminal device 405 is communicatively connected to the wearable AR device 415 and is not communicatively connected to the wearable audio device 410, the terminal device 405 may transmit the audio data and the video data to the wearable AR device 415 through the second wireless communication scheme 420, in the third mode.

In the first mode, the wearable AR device 415 may detect an ambient noise level using the microphone 655 of the wearable AR device 415 and may adjust gain of the amplifier 645 connected to the speaker 430 or 650, 653 of the wearable AR device 415 based on the ambient noise level.

In the first mode, the terminal device 405 may adjust gain of the amplifier 620 connected to the microphone 435, 440 or 630, 633 of the wearable audio device 410 based on the ambient noise level detected by the wearable AR device 415.

In the first mode, the wearable AR device 415 may recognize a person from a video acquired using the camera (245a, 245b) of the wearable AR device 415 and may adjust gain of the amplifier 645 connected to the speaker 430 or 650, 653 of the wearable AR device 415 based on a number of the recognized persons.

In the first mode, the wearable audio device 410 may perform beamforming with respect to the speaker 430 or 650, 653 of the wearable AR device 415 to receive the audio data output from the wearable AR device 415 using at least two microphones 435 and 440 or 630 and 633.

In the first mode, the wearable AR device 415 may perform beamforming with respect to the wearable AR device 410 using at least two speakers 650 and 653 to output the audio data.

Hereinafter, an example embodiment of switching an electronic system from a second mode or a third mode to a first mode is described with reference to FIGS. 7 and 8.

Figure 7:
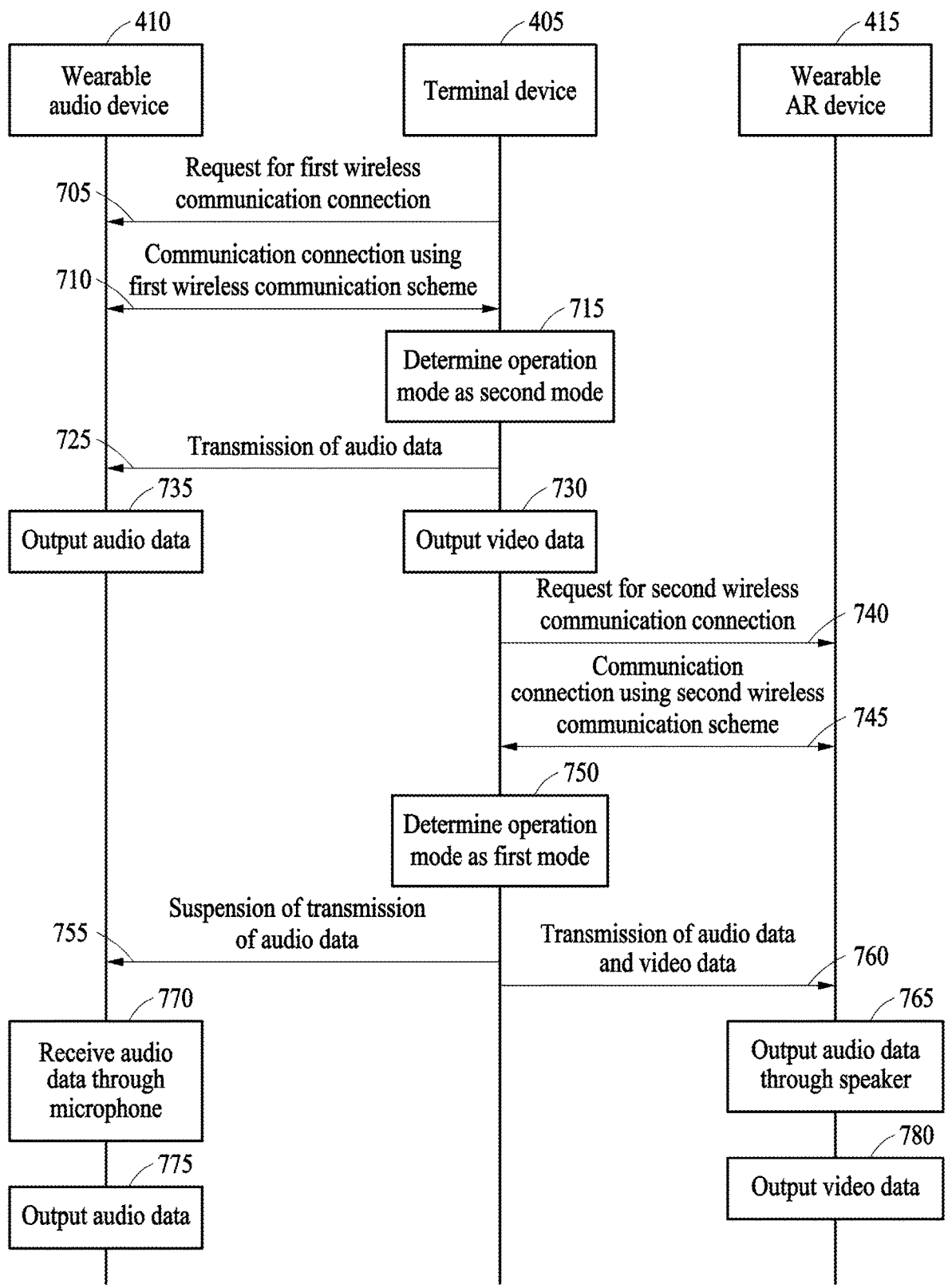
FIGS. 7 and 8 are flowcharts illustrating an operation performed by each device of an electronic system according to an example embodiment.
Figure 8:
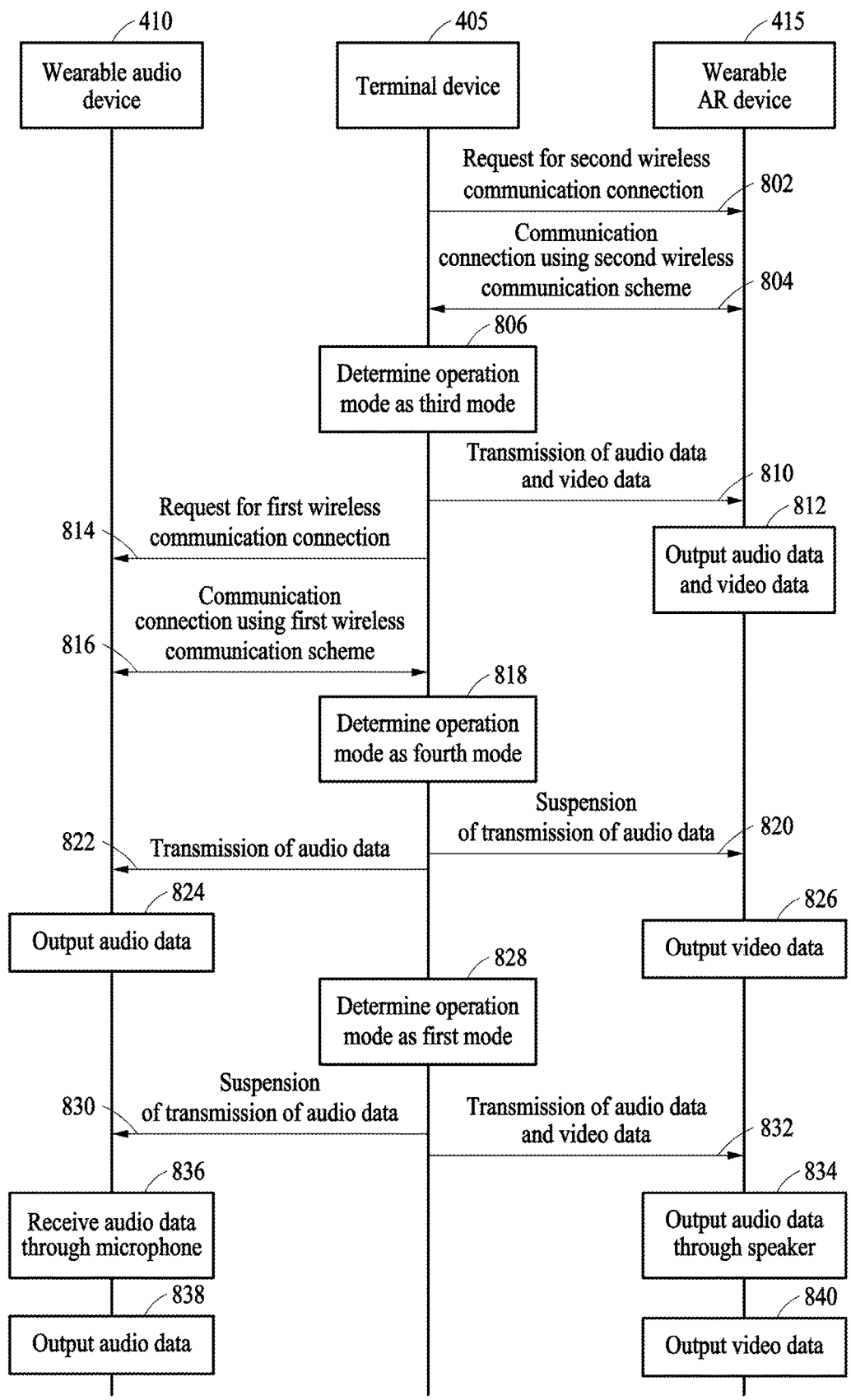

FIGS. 7 and 8 are flowcharts illustrating an operation performed by each device of an electronic system according to an example embodiment.

Referring to FIG. 7, the terminal device 405 may be communicatively connected to the wearable audio device 410. In operation 705, the terminal device 405 may request the wearable audio device 410 for a wireless communication connection of the first wireless communication scheme 425. In operation 710, the wearable audio device 410 may be communicatively connected to the terminal device 405 using the first wireless communication scheme 425 in response to the request from the terminal device 405. In operation 705, although the terminal device 405 requests the wearable audio device 410 for the wireless communication connection of the first wireless communication scheme 425, it is provided as an example only. According to another example embodiment, the wearable audio device 410 may request the terminal device 405 for the wireless communication of the first wireless communication scheme 425.

In operation 715, since the terminal device 405 is communicatively connected to the wearable audio device 410 and is not communicatively connected to the wearable AR device 415, the terminal device 405 may determine an operation mode as a second mode. The terminal device 405 may transmit a control signal to the wearable audio device 410 such that the electronic system 400 may operate in the second mode. The wearable audio device 410 may operate based on the control signal received from the terminal device 405.

In operation 725, the terminal device 405 may transmit, to the wearable audio device 410, audio data generated in association with an application executed by the terminal device 405 using the first wireless communication scheme 425.

In operation 730, the terminal device 405 may output video data generated in association with the application executed by the terminal device 405 through the display (e.g., the display module 160 of FIG. 1) of the terminal device 405. In operation 735, the wearable audio device 410 may output the received audio data through the speaker 625 of the wearable audio device 410. Operation 730 and operation 735 may be substantially simultaneously performed by the terminal device 405 and the wearable audio device 410, respectively. When a delay time of the audio data is to be reduced according to the executed application, the terminal device 405 may transmit the control signal to the wearable audio device 410 to reduce a size of the buffer for audio data reception of the wearable audio device 410. The audio processor 617 of the wearable audio device 410 may reduce the size of the buffer for the audio data reception based on the control signal received from the terminal device 405.

In operation 740, the terminal device 405 may request the wearable AR device 415 for wireless communication connection of the second wireless communication scheme 420. In operation 745, in response to the request, the wearable AR device 415 may be communicatively connected to the terminal device 405 using the second wireless communication scheme 420. Although the terminal device 405 requests the wearable AR device 415 for the wireless communication connection of the second wireless communication scheme 420 in operation 740, it is provided as an example only. According to another example embodiment, the wearable AR device 415 may request the terminal device 405 for the wireless communication connection of the second wireless communication scheme 420.

In an example embodiment, the terminal device 405 may determine again the operation mode in response to a change in a communication connection relationship between the terminal device 405 and the wearable audio device 410 and between the terminal device 405 and the wearable AR device 415 or in response to a change in the application executed by the terminal device 405.

In operation 745, since the terminal device 405 is communicatively connected to the wearable audio device 410 and the wearable AR device 415, the terminal device 405 may determine again the operation mode. In operation 750, the terminal device 405 may determine whether the application executed by the terminal device 405 is an application that provides 3D content. In the example embodiment of FIG. 7, the application may be the application that provides the 3D content and the terminal device 405 may determine the operation mode as a first mode.

In operation 755, the terminal device 405 may suspend an operation of transmitting the audio data to the wearable audio device 410 using the first wireless communication scheme 425 to reduce the delay time of the audio data. According to an example embodiment, the terminal device 405 may transmit the control signal to the wearable audio device 410 and the wearable AR device 415 such that the electronic system 400 may operate in the first mode. The wearable audio device 410 and the wearable AR device 415 may operate according to the control signal received from the terminal device 405.

In operation 760, the terminal device 405 may transmit the video data and the audio data to the wearable AR device 415 using the second wireless communication scheme 420.

In operation 765, the wearable AR device 415 that receives the video data and the audio data may output the audio data through the speaker 650, 653 of the wearable AR device 415. In operation 770, the wearable audio device 410 may receive the audio data output from the speaker 650, 653 of the wearable AR device 415 through the microphone 630, 633 of the wearable audio device 410. By delivering the audio data in a form of sound without using the first wireless communication scheme 425, an amount of time used to transmit the audio data may be reduced.

In operation 775, the wearable audio device 410 may output the audio data received through the microphone 630, 633. In operation 780, the wearable AR device 415 may output the video data through the display of the wearable AR device 415. Operation 775 and operation 780 may be substantially simultaneously performed by the wearable audio device 410 and the wearable AR device 415, respectively.

Referring to FIG. 8, the terminal device 405 may be communicatively connected to the wearable AR device 415. In operation 802, the terminal device 405 may request the wearable AR device 415 for wireless communication connection of the second wireless communication scheme 420. In operation 804, in response to the request from the terminal device 405, the wearable AR device 415 may be communicatively connected to the terminal device 405 using the second wireless communication scheme 420.

In operation 806, since the terminal device 405 is communicatively connected to the wearable AR device 415 and is not communicatively connected to the wearable audio device 410, the terminal device 405 may determine an operation mode as a third mode. In operation 810, the terminal device 405 may transmit, to the wearable AR device 415, audio data and video data generated in association with an application executed by the terminal device 405 using the second wireless communication scheme 420.

In operation 812, the wearable AR device 415 may output the video data through the display of the wearable AR device 415 and may output the audio data through the speaker 650, 653 of the wearable AR device 415. The video data and the audio data may be substantially simultaneously output.

In operation 814, the terminal device 405 may request the wearable audio device 410 for wireless communication connection of the first wireless communication scheme 425. In operation 816, in response to the request from the terminal device 405, the wearable audio device 410 may be communicatively connected to the terminal device 405 using the first wireless communication scheme 425.

In operation 818, since the terminal device 405 is communicatively connected to the wearable audio device 410 and the wearable AR device 415, the terminal device 405 may determine whether the application executed by the terminal device 405 is an application that provides 3D content. In the example embodiment of FIG. 8, the application may be an application that does not provide the 3D content and the terminal device 405 may determine the operation mode as a fourth mode.

In operation 820, the terminal device 405 may suspend an operation of transmitting the audio data to the wearable AR device 415 using the second wireless communication scheme 420. In operation 822, the terminal device 405 may transmit the audio data to the wearable audio device 410 using the first wireless communication scheme 425. When a delay time of the audio data is to be reduced, the terminal device 405 may reduce a size of a buffer to receive the audio data of the wearable audio device 410.

In operation 824, the wearable audio device 410 may output the audio data received from the terminal device 405 through the speaker 625 of the wearable audio device 410. In operation 826, the wearable AR device 415 may output the video data received from the terminal device 405 through the display of the wearable AR device 415.

In operation 828, the application executed by the terminal device 405 may be changed and the terminal device 405 may determine again the operation mode. In FIG. 8, the changed application may be the application that provides the 3D content. Since the terminal device 405 is communicatively connected to the wearable audio device 410 and the wearable AR device 415 and the application executed by the terminal device 405 is the application that provides the 3D content, the terminal device 405 may determine the operation mode as a first mode.

In operation 830, the terminal device 405 may suspend an operation of transmitting the audio data to the wearable audio device 410 using the first wireless communication scheme 425 to reduce the delay time of the audio data. According to an example embodiment, the terminal device 405 may deliver, to the wearable audio device 410, information indicating that the terminal device 405 operates in the first mode. In operation 832, the terminal device 405 may transmit the video data and the audio data to the wearable AR device 415 using the second wireless communication scheme 420.

In operation 834, the wearable AR device 415 that receives the video data and the audio data may output the audio data through the speaker 650, 653 of the wearable AR device 415. In operation 836, the wearable audio device 410 may receive the audio data output from the speaker 650, 653 of the wearable AR device 415 through the microphone 630, 633 of the wearable audio device 410. An amount of time used to transmit the audio data may be reduced by delivering the audio data in a form of sound without using the first wireless communication scheme 425.

In operation 838, the wearable audio device 410 may output the audio data received through the microphone 630, 633. In operation 840, the wearable AR device 415 may output the video data through the display of the wearable AR device 415. Operation 838 and operation 840 may be substantially simultaneously performed through synchronization by the wearable audio device 410 and the wearable AR device 415, respectively.

A method of outputting video data and audio data according to an example embodiment may include an operation of determining whether an application provides 3D content and an operation of operating in a first mode based on determining that the application provides the 3D content. The operation of operating in the first mode may include an operation of receiving, by the wearable AR device 415, the video data and the audio data from the terminal device 405 through the second wireless communication scheme 420, an operation of outputting, by the wearable AR device 415, the audio data through the speaker 430 or 650, 653 of the wearable AR device 415, an operation of receiving, by the wearable audio device 410 communicatively connected to the terminal device 405 through the first wireless communication scheme 425, the audio data output from the wearable AR device 415 using the microphone 435, 440 or 630, 633 of the wearable audio device 410, and an operation of outputting, by the wearable audio device 410, the received audio data through the speaker 625 of the wearable audio device 410.

The second wireless communication scheme 420 may have a delay time less than that of the first wireless communication scheme 425.

The method of outputting video data and audio data according to an example embodiment may further include an operation of determining whether the terminal device 405 is communicatively connected to at least one of the wearable audio device 410 and the wearable AR device 415. The operation of determining whether the application provides the 3D content may be performed when it is determined that the terminal device 405 is communicatively connected to the wearable audio device 410 and the wearable AR device 415.

The method of outputting video data and audio data according to an example embodiment may further include an operation of operating in a second mode when it is determined that the terminal device 405 is communicatively connected to the wearable audio device 415 and is not communicatively connected to the wearable AR device 410. The operating in the second mode may include an operation of transmitting, by the terminal device 405, the audio data to the wearable audio device 410 through the first wireless communication scheme 425 and an operation of outputting, by the wearable audio device 410, the audio data through the speaker 625 of the wearable audio device 410.

The method of outputting video data and audio data according to an example embodiment may further include an operation of operating in a third mode when it is determined that the terminal device 405 is communicatively connected to the wearable audio device 415 and is not communicatively connected to the wearable AR device 410. The operation of operating in the third mode may include an operation of transmitting, by the terminal device 405, the audio data and the video data to the wearable AR device 415 through the second wireless communication scheme 420 and an operation of outputting, by the wearable AR device 415, the audio data and the video data through the speaker 430 or 650, 653, the first display 205 and the second display 210 of the wearable AR device 415, respectively.

The operation of outputting through the speaker 430 or 650, 653 of the wearable AR device 415 may include an operation of detecting an ambient noise level using the microphone 655 of the wearable AR device 415 and adjusting gain of the amplifier 645 connected to the speaker 430 or 650, 653 of the wearable AR device 415 based on the ambient noise level.

The operation of outputting through the speaker 430 or 650, 653 of the wearable AR device 415 may include an operation of performing beamforming with respect to the wearable audio device 410 using at least two speakers 650 and 653.

The operation of outputting through the speaker 430 or 650, 653 of the wearable AR device 415 may include an operation of recognizing a person from a video acquired using the camera 245a, 245b of the wearable AR device 415 and an operation of adjusting gain of the amplifier 645 connected to the speaker 430 or 650, 653 of the wearable AR device 415 based on a number of the recognized persons.

The operation of receiving the audio data may include an operation of performing, by the wearable audio device 410, beamforming with respect to the speaker 430 or 650, 653 of the wearable AR device 415 to receive the audio data output from the wearable AR device 410 using at least two microphones 435 and 440 or 630 and 633.

Figure 9:
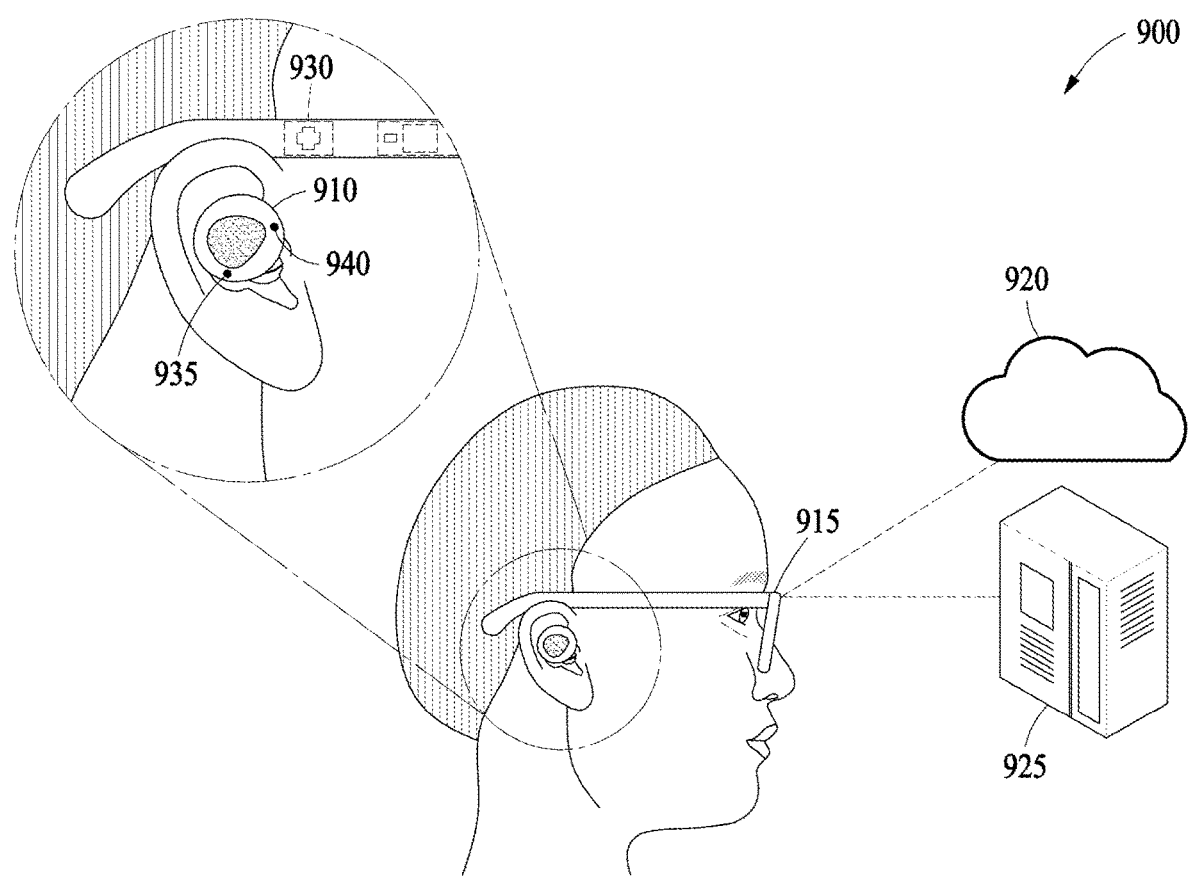
FIG. 9 illustrates an example of an electronic system according to another example embodiment.

FIG. 9 illustrates an example of an electronic system according to another example embodiment.

In the example embodiment of FIG. 9, the electronic system 900 may include a wearable audio device 910 and a wearable AR device 915 (e.g., the wearable AR device 200 of FIG. 2), which is different from the example embodiment of FIGS. 5 to 8. In the example embodiment of FIG. 9, an application may be executed by the wearable AR device 915 and video data and audio data related to the application may be generated, or the application may be executed by the cloud 920 or the server 925 to generate the video data and the audio data related to the application and the video data and the audio data generated by the cloud 920 or the server 925 may be received by the wearable AR device 915 through a long-range wireless communication. The wearable AR device 915 may output the audio data through a speaker 930 of the wearable AR device 915 and may output the video data through a display of the wearable AR device 915 (e.g., the first display 205 and the second display 210 of FIG. 2).

The wearable audio device 910 may be worn on the ear of the user and may output the audio data to the ear of the user. Since the audio data is output through a speaker (not shown) of the wearable audio device 910, the user may hear sound.

The wearable AR device 915 may be connected to the wearable audio device 910 through a wireless communication. For example, the wearable AR device 915 and the wearable audio device 910 may be communicatively connected through a short-range wireless communication scheme, such as Bluetooth™. The wearable AR device 915 wirelessly communicates with the wearable audio device 910, which may improve convenience compared to a wired communication. However, due to a delay time of the audio data occurring in a wireless communication process, it may be difficult to synchronize video and audio.

If the video data and the audio data are not synchronized, the user of the electronic system 900 may feel uncomfortable. In the case of an application that provides 3D content responding to a movement of the user, such as AR content and/or VR content, the wearable AR device 915 may perform head tracking in response to a movement or a rotation of the face of the user, and, based on this, a viewpoint of video output to the display of the wearable AR device 915 may need to move or rotate together. Also, the audio data may provide spatial audio and a direction and magnitude of sound output from the wearable audio device 910 may need to be changed. In the above process, when the video data of the wearable AR device 915 and the audio data of the wearable audio device 910 are not synchronized or when the delay time of the audio data increases, the user may feel more uncomfortable than in the case of 2D content due to a time difference between a visual stimulus and an auditory stimulus.

Although the wearable AR device 915 may delay and output the video data for synchronization of the video data and the audio data, it may be unsuitable for an application, such as a game that outputs video and audio in response to an action of the user in real time. A size of a buffer used to receive the audio data may be reduced to decrease the delay time in the wearable audio device 910. However, in the case of reducing the size of the buffer, audio chopping may occur and quality of sound being output may be degraded.

According to the electronic system 900 for video and audio synchronization according to another example embodiment, the audio data may be delivered to the wearable audio device 910 using output of the speaker 930 of the wearable AR device 915. The wearable audio device 910 may receive the audio data that is output from the speaker 930 of the wearable AR device 915 using one or more microphones 935 and 940 of the wearable audio device 910 and may output the received audio data through the speaker of the wearable audio device 910.

The wearable AR device 915 may be worn on the face of the user in a form of glasses and an HMD and the wearable audio device 910 may be worn on the ear of the user in a form of an earphone, a headset, and a headphone. In the wearable AR device 915, the speaker 930 may be provided close to an auricle of the user and the speaker 930 of the wearable AR device 915 may be positioned spatially close to the wearable audio device 910 worn on the ear of the user as illustrated in FIG. 9. The wearable audio device 910 is positioned close to the speaker 930 of the wearable AR device 915. Therefore, although sound output from the speaker 930 of the wearable AR device 915 is not loud, the wearable audio device 910 can receive the audio data through the microphone 935, 940

The method and the electronic system 900 according to another example embodiment may reduce a delay time of audio data transmission and may synchronize audio data and video data of the wearable AR device 915 by delivering the audio data without using a wireless communication having a substantial delay time.

Figure 10:
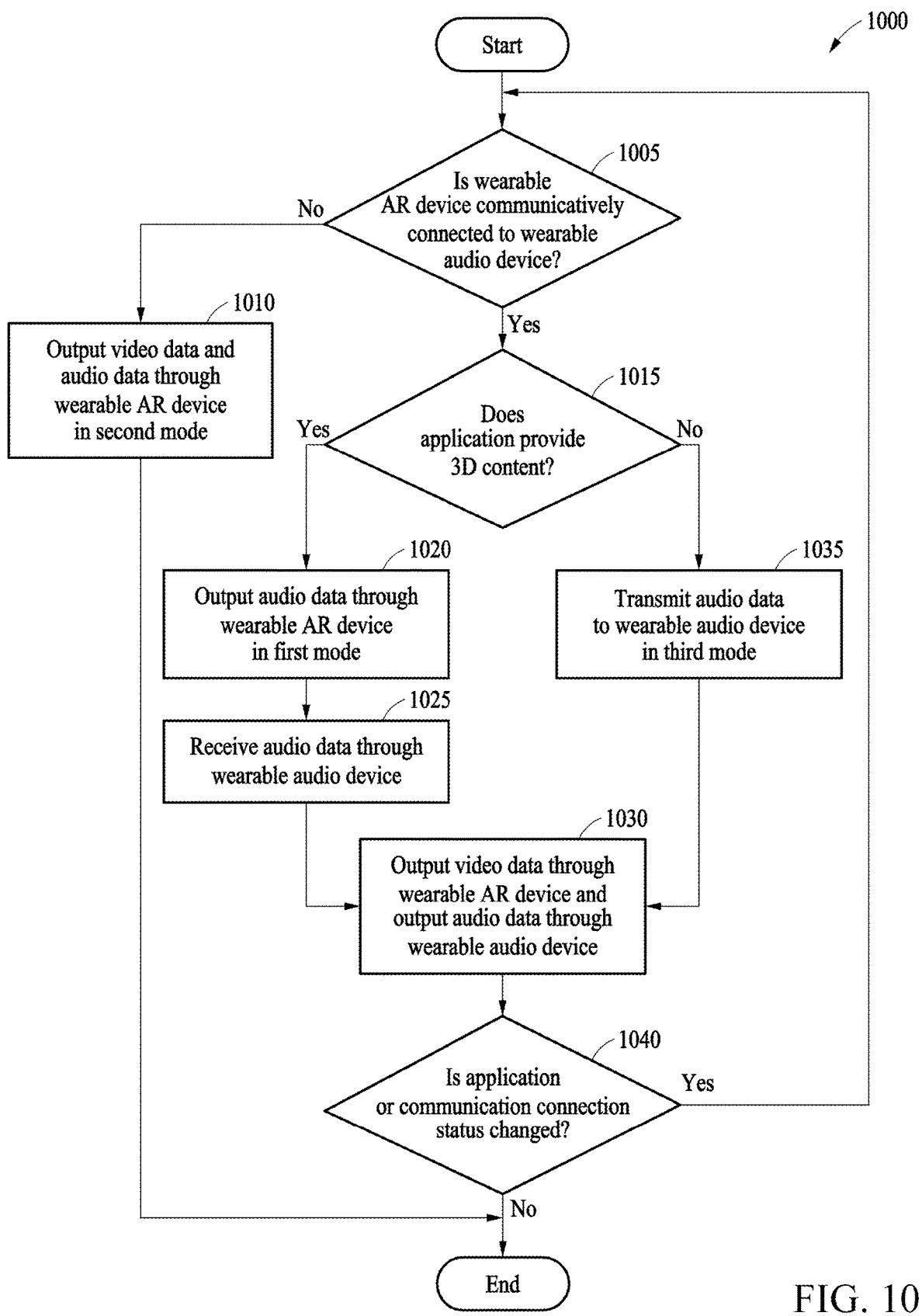
FIG. 10 is a flowchart illustrating a method according to another example embodiment.
Figure 11:
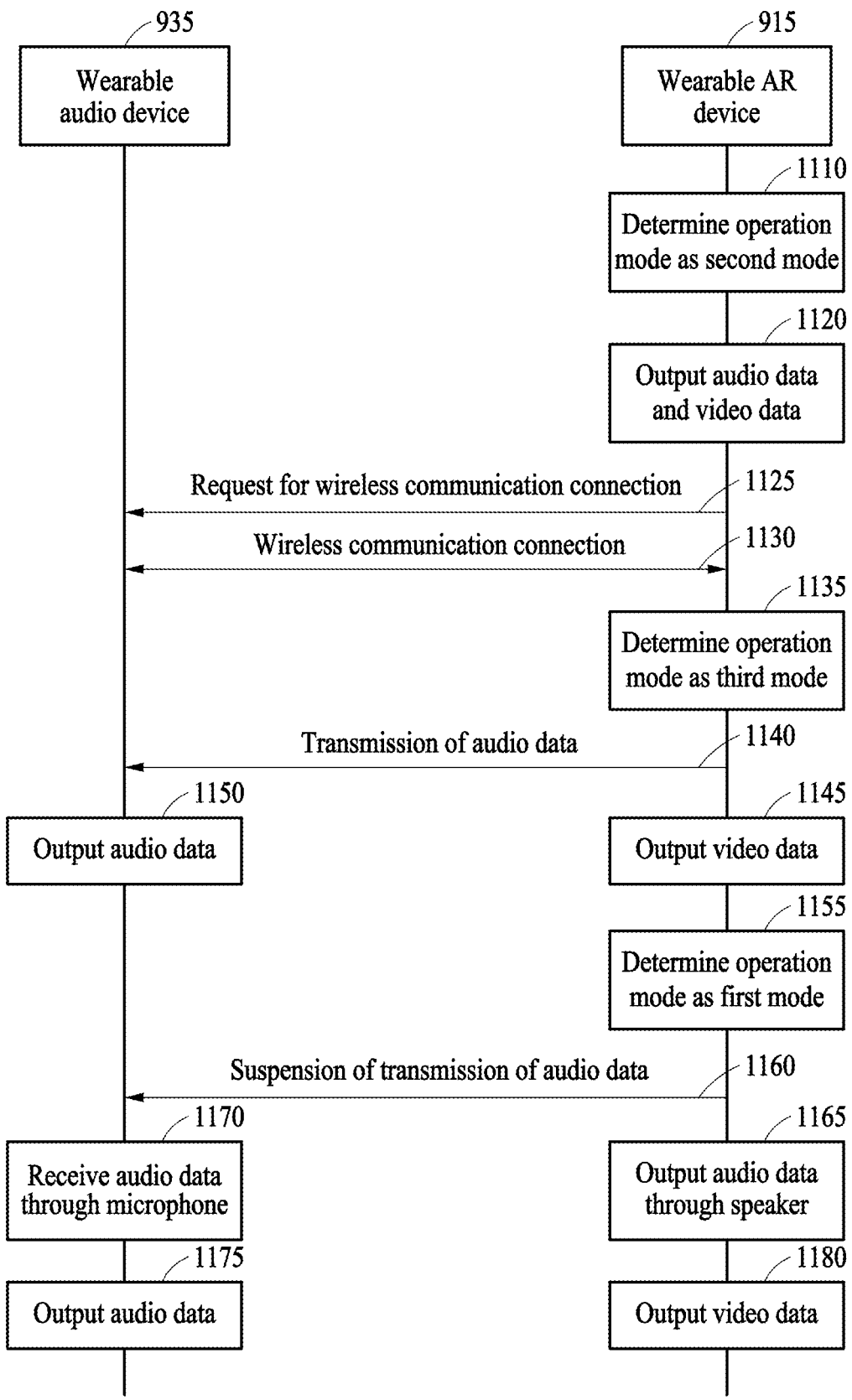
FIG. 11 is a flowchart illustrating an operation performed by each device of an electronic system according to another example embodiment.

FIG. 10 is a flowchart illustrating a method 1000 according to another example embodiment, and FIG. 11 is a flowchart illustrating an operation performed by each device of an electronic system according to another example embodiment.

Referring to FIG. 10, the electronic system 900 may determine an operation mode based on a communication connection status between the wearable AR device 915 and the wearable audio device 910 and content provided from an application executed by the electronic system 900.

In operation 1005, the electronic system 900 may determine whether the wearable AR device 915 is communicatively connected to the wearable audio device 910. When the wearable AR device 915 is communicatively connected to the wearable audio device 910, the electronic system 900 may determine whether the application executed by the electronic system 900 provides 3D content, such as VR content and/or AR content, in operation 1015.

When the application provides the 3D content, the user may feel discomfort due to out-of-synchronization between video data of the wearable AR device 915 and audio data of the wearable audio device 910 or a long delay time of the audio data. Therefore, to minimize this, the delay time of the audio data may be reduced. To reduce user discomfort, when the application provides the 3D content, the electronic system 900 may determine an operation mode of the electronic system 900 as a first mode with a shortest delay time until audio data is output in operation 1020. The first mode may be a mode for delivering the audio data using the speaker 930 of the wearable AR device 915 and the microphone 935, 940 of the wearable audio device 910.

In operation 1020, the wearable AR device 915 may output the audio data as sound through the speaker 930 of the wearable AR device 915. In operation 1025, the electronic system 900 may receive the audio data output from the speaker 930 of the wearable AR device 915 through the microphone 935, 940 of the wearable audio device 910.

In operation 1030, the electronic system 900 may output the audio data received by the wearable audio device 910 through the speaker of the wearable audio device 910 and may output the video data through the display of the wearable AR device 915. The user may wear the wearable audio device 910 on the ear and may hear sound output through the speaker of the wearable audio device 910 and may wear the wearable AR device 915 on the face and may view a video output to the display of the wearable AR device 915.

In a first mode, since the audio data is delivered from the wearable AR device 915 to the wearable audio device 910 using the speaker 930 and the microphone 935, 940 (e.g., using an audio communication in an audible frequency range) without using a wireless communication scheme (e.g., an encoded transmission in a nonaudible frequency range), a delay time may be reduced compared to delivery of audio data by a wireless communication scheme. Since the audio delay time is reduced in the first mode, the video data output from the wearable AR device 915 and the audio data output from the wearable audio device 910 may be substantially simultaneously output.

In the first mode, since the wearable audio device 910 receives the audio data using the microphone 935, 940, ambient noise may also be received with the audio data. The audio data is output from the wearable AR device 915 in a form of sound through the speaker 930. Therefore, if it is quiet and there is a person around the wearable AR device 915, the person may hear the output sound. To prevent the other person from hearing the sound, the wearable AR device 915 may detect an ambient noise level through a microphone (not shown) of the wearable AR device 915 and may adjust gain of an amplifier (not shown) (e.g., the amplifier 645 of FIG. 6) connected to the speaker 930 of the wearable AR device 915 based on the detected ambient noise level. The wearable AR device 915 may adjust the gain of the amplifier (not shown) connected to the speaker 930 of the wearable AR device 915 in proportion to the detected ambient noise level. The wearable AR device 915 may set the gain of the amplifier (not shown) connected to the speaker 930 of the wearable AR device 915 to decrease according to a decrease in the detected ambient noise level and may set the gain of the amplifier (not shown) connected to the speaker 930 of the wearable AR device 915 to increase according to an increase in the detected ambient noise level.

In a situation in which the ambient noise level is detected as low, an SNR of the audio data received by the microphone 935, 940 of the wearable audio device 910 may be sufficiently large although the gain of the amplifier (not shown) connected to the speaker 930 of the wearable AR device 915 is low and sufficiently large output may be provided from the speaker (not shown) of the wearable audio device 910 through amplification using the amplifier (not shown) (e.g., the amplifier 620 of FIG. 6) of the wearable audio device 910. In a situation which the ambient noise level is detected as high, the SNR of the audio data received by the microphone 935, 940 of the wearable audio device 910 may not be sufficiently large. Therefore, the gain of the amplifier (not shown) for the audio data output of the wearable AR device 915 may need to be large.

The wearable AR device 915 may recognize a person from video acquired using the camera (not shown) (e.g., the first camera 245a, 245b of FIG. 2) of the wearable AR device 915 and may adjust gain of the amplifier connected to the speaker 930 of the wearable AR device 915 based on a number of recognized persons. When a large number of persons are detected in the video acquired using the camera, people around the user may hear the sound if the gain of the amplifier (not shown) connected to the speaker 930 of the wearable AR device 915 increases. To prevent this, the wearable AR device 915 may adjust the gain of the amplifier (not shown) connected to the speaker 930 to decrease according to an increase in the number of persons detected in the video acquired using the camera.

The gain of the amplifier (not shown) connected to the microphone 935, 940 of the wearable audio device 910 may be adjusted based on the ambient noise level detected by the wearable AR device 915. The wearable AR device 915 may adjust the gain of the amplifier (not shown) connected to the microphone 935, 940 of the wearable audio device 910 based on the ambient noise level detected by the wearable AR device 915. The wearable AR device 915 may transmit a control signal for adjusting the gain of the amplifier (not shown) of the wearable audio device 910 to the wearable audio device 910 using a wireless communication scheme (e.g., Bluetooth™, WiFi). The wearable audio device 910 may receive the control signal from the wearable AR device 915 and an audio processor (not shown) of the wearable audio device 910 may adjust gain of the amplifier based on the control signal.

According to a decrease in the detected ambient noise level, the gain of amplifier (not shown) connected to the microphone 935, 940 of the wearable audio device 910 may be set to increase. According to an increase in the detected ambient noise level, the gain of the amplifier (not shown) connected to the microphone 935, 940 of the wearable audio device 910 may be set to decrease. In a situation in which the ambient noise level is detected as low, the gain of the amplifier (not shown) connected to the speaker 930 of the wearable AR device 915 sets to be low. Therefore, to provide sufficient output for the user to hear sound, the gain of the amplifier (not shown) connected to the microphone 935, 940 of the wearable audio device 910 may need to be large. In a situation in which the ambient noise level is detected as high, if the gain of the amplifier (not shown) connected to the microphone 935, 940 of the wearable audio device 910 is set to be large, ambient noise may be amplified. To prevent this, the gain of the amplifier (not shown) connected to the microphone 935, 940 of the wearable audio device 910 may need to be low.

In the first mode, if the ambient noise level detected through the microphone (not shown) (e.g., the microphone 655 of FIG. 6) is greater than or equal to a threshold (e.g., a specific numerical value, such as 20 dB), the wearable AR device 915 may perform beamforming with respect to the microphone 935, 940 of the wearable audio device 910 using two or more speakers 930 (e.g., the speakers 650 and 653 of FIG. 6) of the wearable AR device 915 to increase an SNR when receiving audio data through the microphones 935 and 940 of the wearable audio device 910.

If the ambient noise level detected through the microphone (not shown) is greater than or equal to the threshold (e.g., a specific numerical value, such as 20 dB), the wearable AR device 915 may control the wearable audio device 910 such that two or more microphones 935 and 940 of the wearable audio device 910 may perform beamforming with respect to the speakers 930 of the wearable AR device 915 to increase an SNR when receiving audio data through the microphones 935 and 940 of the wearable audio device 910. If the ambient noise level detected through the microphone (not shown) of the wearable AR device 915 is greater than or equal to the threshold (e.g., a specific numerical value, such as 20 dB), the wearable audio device 910 may be controlled by the wearable AR device 915 and perform beamforming with respect to the speakers 930 of the wearable AR device 915 using two or more microphones 935 and 940.

In the first mode, since the microphone 935, 940 of the wearable audio device 910 is used to receive the audio data output from the wearable AR device 915, the electronic system 900 may receive an audio input through the microphone (not shown) of the wearable AR device 915.

When it is determined that the application is not the application that provides the 3D content in operation 1015, the electronic system 900 may determine the operation mode as a third mode in operation 1035. The third mode may be a mode in which the video data is output from the wearable AR device 915 and the audio data is transmitted to the wearable audio device 910 through a wireless communication scheme. In the third mode, the wearable AR device 915 may transmit the audio data to the wearable audio device 910 using the wireless communication scheme. When the application is an application that does not provide the 3D content, user discomfort caused by the delay time of the audio data may be relatively less and thus, the audio data may be transmitted from the wearable AR device 915 to the wearable audio device 910 using the wireless communication scheme. When using the wireless communication scheme, a size of a buffer used to receive the audio data may be decreased to reduce the delay time in the wearable audio device 910.

When it is determined that the wearable AR device 915 is not communicatively connected to the wearable audio device 910 in operation 1005, the electronic system 900 may determine the operation mode as a second mode in operation 1010. The second mode may be a mode in which the video data and the audio data are output from the wearable AR device 915 without being transmitted to another electronic device. In the second mode, the wearable AR device 915 is not communicatively connected to the other electronic device and thus, may output the video data through the display of the wearable AR device 915 and may output the audio data through the speaker 930 of the wearable AR device 915. The user may view the video output through the display of the wearable AR device 915 and may hear the sound output through the speaker 930 of the wearable AR device 915. Since the video data and the audio data are output from a single device, the video data and the audio data may be synchronized and thereby output.

In operation 1040, the wearable AR device 915 may determine whether the executed application is changed or whether a communication connection status between the wearable AR device 915 and the wearable audio device 910 is changed. When one of the executed application and the communication connection status between the wearable AR device 915 and the wearable audio device 910 is changed, the electronic system 900 may return to operation 1005 and then determine again the connection status and operation mode of the electronic system 900. When there is no change in the executed application and the communication connection status between the wearable AR device 915 and the wearable audio device 910, the electronic system 900 may not take any special action.

Referring to FIG. 11, the wearable audio device 910 and the wearable AR device 915 may be in a communicatively disconnected status. In operation 1110, since the wearable AR device 915 is not communicatively connected to the wearable audio device 910, the wearable AR device 915 may determine an operation mode as a second mode. In operation 1120, the wearable AR device 915 may output video data through the display of the wearable AR device 915 and may output audio data through the speaker 930 of the wearable AR device 915.

In operation 1125, the wearable AR device 915 may request the wearable audio device 910 for wireless communication connection. In operation 1130, in response to the request from the wearable AR device 915, the wearable audio device 910 may be connected to the wearable AR device 915 in a wireless communicative manner.

In operation 1135, in response to a change in the communication connection status between the wearable AR device 915 and the wearable audio device 910, the wearable AR device 915 may determine again the operation mode. In the example embodiment of FIG. 11, the application executed by the wearable AR device 915 may be an application that does not provide the 3D content and the wearable AR device 915 may determine the operation mode as a third mode.

In operation 1140, the wearable AR device 915 may transmit the audio data to the wearable audio device 910 using a wireless communication scheme. When a delay time of the audio data is to be reduced according to the executed application, the wearable AR device 915 may reduce the size of the buffer for audio data reception of the wearable audio device 910.

In operation 1145, the wearable AR device 915 may output the video data through the display of the wearable AR device 915. In operation 1150, the wearable audio device 910 may output the received audio data through the speaker of the wearable audio device 910. Operation 1145 and operation 1150 may be substantially simultaneously performed by the wearable AR device 915 and the wearable audio device 910, respectively.

In operation 1155, the executed application may be changed and the wearable AR device 915 may determine again the operation mode of the electronic system 900. The changed application may be an application that provides the 3D content and the wearable AR device 915 may determine the operation mode of the electronic system 900 as a first mode.

In operation 1160, the wearable AR device 915 may suspend an operation of transmitting the audio data to the wearable audio device 910 using the wireless communication scheme to reduce the delay time of the audio data. According to an example embodiment, the wearable AR device 915 may share information indicating that the operation mode of the wearable AR device 915 is changed with the wearable audio device 910. In operation 1165, the wearable AR device 915 may output the audio data through the speaker 930 of the wearable AR device 915.

In operation 1170, the wearable audio device 910 may receive the audio data output from the speaker 930 of the wearable AR device 915 through the microphone 935, 940 of the wearable audio device 910. The delay time used by output of the audio data may be reduced by delivering the audio data in a form of sound without using the wireless communication scheme.

In operation 1175, the wearable audio device 910 may output the audio data received through the microphone 935, 940. In operation 1180, the wearable AR device 915 may output the video data through the display of the wearable AR device 915. Operation 1175 and operation 1180 may be substantially simultaneously performed by the wearable audio device 910 and the wearable AR device 915.

The electronic system 900 for outputting video data and audio data according to another example embodiment may include the wearable AR 915 configured to generate the audio data and the video data and the wearable audio device 910 to receive the audio data from the wearable AR device 915 through a wireless communication connection with the wearable AR device 915 and to output the audio data. Based on determining that the application provides 3D content; in the first mode, the wearable AR device 915 outputs the audio data through the speaker 930 of the wearable AR device 915 and the wearable audio device 910 receives the audio data output from the wearable AR device 915 using the microphone 935, 940 of the wearable audio device 910 and outputs the audio data received from the wearable AR device 915 through the speaker of the wearable audio device 910.

The wearable AR device 915 may determine whether the wearable AR device 915 is communicatively connected to the wearable audio device 910. When the wearable AR device 915 is communicatively connected to the wearable audio device 910, the wearable AR device 915 may determine whether the application provides the 3D content. Based on determining that the application provides the 3D content, the wearable AR device 915 may control the wearable audio device 910 such that the electronic system 900 may operate in the first mode.

As further example, a method performed by the electronic system 900 for outputting video data and audio data related to an application can include determining whether the application provides 3D content, as previously described in reference to operation 1015 of method 1000 of FIG. 10. Based on determining that the application provides the 3D content at operation 1015, the audio data is output through a speaker 930 of a wearable AR device 915 of the electronic system 900 and the audio data is received through a microphone 935, 940 of a wearable audio device 910 of the electronic system 900. Based on determining that the application does not provide the 3D content at operation 1015, the audio data is transmitted to the wearable audio device 910. The video data is output through the wearable AR device 915.

As further example, a method performed by the electronic system 900 can include determining whether the wearable AR device 915 is communicatively connected to the wearable audio device 910, as previously described in reference to operation 1005 of method 1000 of FIG. 10. Based on determining that the wearable AR device 915 is not communicatively connected to the wearable audio device 910 at operation 1005, the audio data can be output through the speaker 930 of the wearable AR device 915. Based on determining that the wearable AR device 915 is communicatively connected to the wearable audio device 910 at operation 1005, the audio data can be output through a speaker of the wearable audio device 910.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected to," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the terminal device 101) For example, a processor (e.g., the processor 120) of the machine (e.g., the terminal device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic system for outputting video data and audio data related to an application, the electronic system comprising:
   a terminal device which generates the audio data and the video data;
   a wearable audio device which communicatively connects to the terminal device through a first wireless communication scheme; and
   a wearable augmented reality (AR) device which communicatively connects to the terminal device through a second wireless communication scheme,
   wherein, based on determining that the application provides three-dimensional (3D) content,
   in a first mode,
   the wearable AR device receives the audio data and the video data from the terminal device, outputs the video data through a display of the wearable AR device, and outputs the audio data through a speaker of the wearable AR device, and
   the wearable audio device receives the audio data output from the wearable AR device using a microphone of the wearable audio device and outputs the audio data received from the wearable AR device through a speaker of the wearable audio device.

2. The electronic system of claim 1, wherein the second wireless communication scheme has a delay time less than that of the first wireless communication scheme.

3. The electronic system of claim 1, wherein the terminal device determines whether the terminal device is communicatively connected to the wearable audio device and the wearable AR device,
   when the terminal device is communicatively connected to the wearable audio device and the wearable AR device, determines whether the application provides the 3D content, and
   based on determining that the application provides the 3D content, controls the wearable audio device and the wearable AR device such that the electronic system operates in the first mode.

4. The electronic system of claim 3, wherein, when the terminal device is communicatively connected to the wearable audio device and is not communicatively connected to the wearable AR device,
   in a second mode,
   the terminal device transmits the audio data to the wearable audio device through the first wireless communication scheme, and
   when the terminal device is communicatively connected to the wearable AR device and is not communicatively connected to the wearable audio device,
   in a third mode,
   the terminal device transmits the audio data and the video data to the wearable AR device through the second wireless communication scheme.

5. The electronic system of claim 1, wherein, in the first mode, the wearable AR device detects an ambient noise level using a microphone of the wearable AR device and adjusts gain of an amplifier connected to the speaker of the wearable AR device based on the ambient noise level.

6. The electronic system of claim 5, wherein, in the first mode, the terminal device adjusts gain of an amplifier connected to the microphone of the wearable audio device based on the ambient noise level detected by the wearable AR device.

7. The electronic system of claim 1, wherein, in the first mode, the wearable AR device recognizes a person from a video acquired using a camera of the wearable AR device and adjusts gain of an amplifier connected to the speaker of the wearable AR device based on a number of the recognized persons.

8. The electronic system of claim 1, wherein, in the first mode, the wearable audio device performs beamforming with respect to the speaker of the wearable AR device to receive the audio data output from the wearable AR device using at least two microphones.

9. The electronic system of claim 1, wherein, in the first mode, the wearable AR device performs beamforming with respect to the wearable audio device using at least two speakers to output the audio data.

10. A method performed by an electronic system for outputting video data and audio data related to an application, the method comprising:
    determining whether the application provides three-dimensional (3D) content; and
    operating in a first mode based on determining that the application provides the 3D content,
    wherein the operating in the first mode comprises:
    receiving, by a wearable augmented reality (AR) device, the audio data and the video data from a terminal device through a second wireless communication scheme;
    outputting, by the wearable AR device, the audio data through a speaker of the wearable AR device;
    receiving, by a wearable audio device communicatively connected to the terminal device through a first wireless communication scheme, the audio data output from the wearable AR device using a microphone of the wearable audio device; and
    outputting, by the wearable audio device, the received audio data through a speaker of the wearable audio device.

11. The method of claim 10, wherein the second wireless communication scheme has a delay time less than that of the first wireless communication scheme.

12. The method of claim 11, further comprising:
    determining whether the terminal device is communicatively connected to at least one of the wearable audio device and the wearable AR device,
    wherein the determining whether the application provides the 3D content is performed when it is determined that the terminal device is communicatively connected to the wearable audio device and the wearable AR device.

13. The method of claim 12, further comprising:
    operating in a second mode when it is determined that the terminal device is communicatively connected to the wearable audio device and is not communicatively connected to the wearable AR device,
    wherein the operating in the second mode comprises:
    transmitting, by the terminal device, the audio data to the wearable audio device through the first wireless communication scheme; and
    outputting, by the wearable audio device, the audio data through the speaker of the wearable audio device.

14. The method of claim 13, further comprising:
    operating in a third mode when the terminal device is communicatively connected to the wearable AR device and is not communicatively connected to the wearable audio device,
    wherein the operating in the third mode comprises:
    transmitting, by the terminal device, the audio data and the video data to the wearable AR device through the second wireless communication scheme; and
    outputting, by the wearable AR device, the audio data and the video data through the speaker and a display of the wearable AR device, respectively.

15. The method of claim 10, wherein the outputting through the speaker of the wearable AR device comprises detecting an ambient noise level using a microphone of the wearable AR device and adjusting gain of an amplifier connected to the speaker of the wearable AR device based on the ambient noise level.

16. The method of claim 10, wherein the outputting through the speaker of the wearable AR device comprises performing beamforming with respect to the wearable audio device using at least two speakers.

17. The method of claim 10, wherein the outputting through the speaker of the wearable AR device comprises:
    recognizing a person from a video acquired using a camera of the wearable AR device; and
    adjusting gain of an amplifier connected to the speaker of the wearable AR device based on a number of the recognized persons.

18. The method of claim 10, wherein the receiving the audio data comprises performing, by the wearable audio device, beamforming with respect to the speaker of the wearable AR device to receive the audio data output from the wearable AR device using at least two microphones.

19. An electronic system for outputting video data and audio data related to an application, the electronic system comprising:
    a wearable augmented reality (AR) device configured to generate the audio data and the video data; and
    a wearable audio device configured to receive the audio data from the wearable AR device through a wireless communication connection with the wearable AR device and to output the audio data,
    wherein, based on determining that the application provides three-dimensional (3D) content,
    in a first mode,
    the wearable AR device outputs the audio data through a speaker of the wearable AR device, and
    the wearable audio device receives the audio data output from the wearable AR device using a microphone of the wearable audio device and outputs the audio data received from the wearable AR device through a speaker of the wearable audio device.

20. The electronic system of claim 19, wherein the wearable AR device determines whether the wearable AR device is communicatively connected to the wearable audio device,
    when the wearable AR device is communicatively connected to the wearable audio device, determines whether the application provides the 3D content, and
    based on determining that the application provides the 3D content, controls the wearable audio device such that the electronic system operates in the first mode.

* * * * *